(12) United States Patent
Bradlow et al.

(10) Patent No.: US 9,612,599 B2
(45) Date of Patent: Apr. 4, 2017

(54) LAUNCHING UNMANNED AERIAL COPTER FROM MID-AIR

(71) Applicant: Lily Robotics, Inc., San Francisco, CA (US)

(72) Inventors: Henry W. Bradlow, Berkeley, CA (US); Antoine Balaresque, Berkeley, CA (US)

(73) Assignee: Lily Robotics, Inc., San Francisco, CA (US)

( * ) Notice: Subject to any disclaimer, the term of this patent is extended or adjusted under 35 U.S.C. 154(b) by 0 days.

(21) Appl. No.: 15/053,592

(22) Filed: Feb. 25, 2016

(65) Prior Publication Data

US 2016/0179096 A1 Jun. 23, 2016

Related U.S. Application Data

(63) Continuation-in-part of application No. PCT/US2015/032240, filed on May 22, 2015.
(Continued)

(51) Int. Cl.
*G05D 1/00* (2006.01)
*B64C 31/04* (2006.01)
(Continued)

(52) U.S. Cl.
CPC .......... *G05D 1/0661* (2013.01); *B64C 19/00* (2013.01); *B64C 27/00* (2013.01); *B64C 27/08* (2013.01);
(Continued)

(58) Field of Classification Search
USPC ................................................ 701/8; 244/64
See application file for complete search history.

(56) References Cited

U.S. PATENT DOCUMENTS 8,909,391 B1 * 12/2014 Peeters ................ G05D 1/0027
701/2
8,948,935 B1 * 2/2015 Peeters ................. B64C 39/024
701/3
(Continued)

FOREIGN PATENT DOCUMENTS

| RU | 2315255 C1 | 1/2008 |
| RU | 2319191 C1 | 3/2008 |
| RU | 137814 UI | 2/2014 |

OTHER PUBLICATIONS

PCT Search Report and Written Opinion, mailed Oct. 15, 2015'; PCT Application No. PCT/US2015/032240.
(Continued)

*Primary Examiner* — Tyler Paige
(74) *Attorney, Agent, or Firm* — Perkins Coie LLP

(57) ABSTRACT

An unmanned aerial vehicle (UAV) copter for consumer photography or videography can be launched by a user throwing the UAV copter into mid-air. The UAV copter can detect that the UAV copter has been thrown upward while propeller drivers of the UAV copter are inert. In response to detecting that the UAV copter has been thrown upward, the UAV copter can compute power adjustments for propeller drivers of the UAV copter to have the UAV copter reach a predetermined elevation above an operator device. The UAV copter can then supply power to the propeller drivers in accordance with the computed power adjustments.

20 Claims, 22 Drawing Sheets

Related U.S. Application Data

(60) Provisional application No. 62/002,737, filed on May 23, 2014, provisional application No. 62/002,740, filed on May 23, 2014, provisional application No. 62/002,745, filed on May 23, 2014, provisional application No. 62/002,748, filed on May 23, 2014, provisional application No. 62/028,954, filed on Jul. 25, 2014.

(51) Int. Cl.
  *G05D 1/06* (2006.01)
  *B64C 19/00* (2006.01)
  *B64C 27/00* (2006.01)
  *B64C 39/02* (2006.01)
  *G05D 1/10* (2006.01)
  *B64C 27/08* (2006.01)

(52) U.S. Cl.
  CPC ............ *B64C 39/02* (2013.01); *B64C 39/024* (2013.01); *G05D 1/0022* (2013.01); *G05D 1/0094* (2013.01); *G05D 1/102* (2013.01); *B64C 2201/024* (2013.01); *B64C 2201/027* (2013.01); *B64C 2201/08* (2013.01); *B64C 2201/108* (2013.01); *B64C 2201/127* (2013.01); *B64C 2201/141* (2013.01); *B64C 2201/145* (2013.01); *B64C 2201/146* (2013.01)

(56) References Cited

U.S. PATENT DOCUMENTS

| | | | |
|---|---|---|---|
| 2014/0008496 A1 | 1/2014 | Ye et al. | |
| 2014/0037278 A1 | 2/2014 | Wang et al. | |
| 2014/0231590 A1* | 8/2014 | Trowbridge | A63H 27/12 244/175 |
| 2015/0370250 A1* | 12/2015 | Bachrach | G05D 1/0016 701/2 |
| 2016/0009412 A1* | 1/2016 | Manasseh | B64F 1/04 244/63 |
| 2016/0101856 A1* | 4/2016 | Kohstall | B64C 1/00 244/17.13 |

OTHER PUBLICATIONS

Zinchenko, H.E., "Bespilotny Letatelny Apparat Primenenie v Tseliakh Aerofotosiemki Dlya Kartografirovania", (machine translation attached); Moscow, Russia; <www.racurs.ru/www.download/articles/UAV_1.pdf>; 2011, pp. 1-11.

* cited by examiner

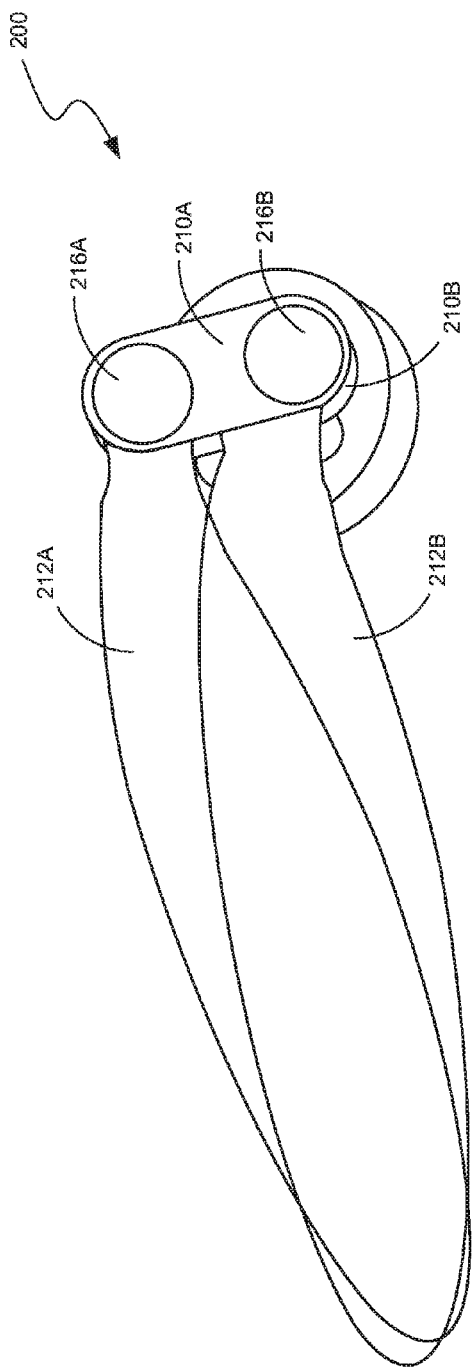
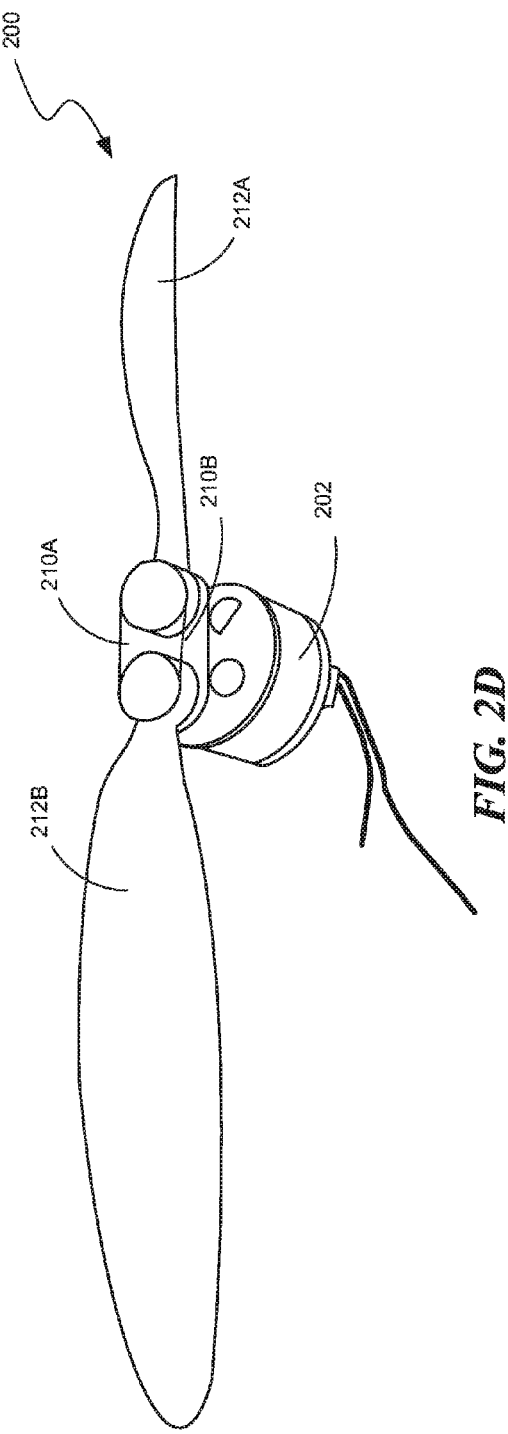
FIG. 2C
FIG. 2D

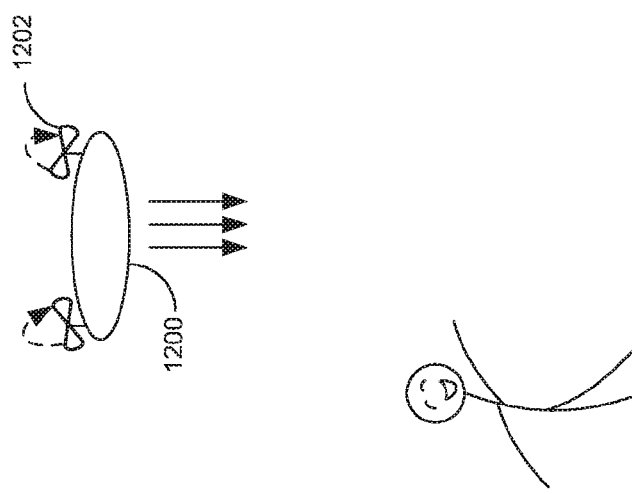

LAUNCHING UNMANNED AERIAL COPTER FROM MID-AIR

CROSS-REFERENCE TO RELATED APPLICATION

This application is a continuation-in-part (CIP) application of PCT International Patent Application No. PCT/US2015/032240, entitled "UNMANNED AERIAL COPTER FOR PHOTOGRAPHY AND/OR VIDEOGRAPHY," which was filed on May 22, 2015 and claims the benefit of: U.S. Provisional Patent Application No. 62/002,737, entitled "FOLDING PROPELLERS FOR PROFILE REDUCTION OF AN UNMANNED AERIAL COPTER," which was filed on May 23, 2014; U.S. Provisional Patent Application No. 62/002,740, entitled "BATTERY SWAPPING MECHANISMS FOR AN UNMANNED AERIAL COPTER," which was filed on May 23, 2014; U.S. Provisional Patent Application No. 62/002,745, entitled "THIRD-PERSON CAMERA PERSPECTIVE IMAGING USING AN UNMANNED AERIAL COPTER," which was filed on May 23, 2014; U.S. Provisional Patent Application No. 62/002,748, entitled "MECHANISM FOR LAUNCHING AN UNMANNED AERIAL COPTER IN MID-AIR," which was filed on May 23, 2014; and U.S. Provisional Patent Application No. 62/028,954, entitled "DEVELOPER TOOLKIT TO PROVIDE THIRD-PARTY CONTROL APPLICATIONS TO AN AUTONOMOUS DRONE," which was filed on Jul. 25, 2014; all of which are incorporated by reference herein in their entirety.

RELATED FIELD

At least one embodiment of this disclosure relates generally to unmanned aerial vehicles (UAVs), and in particular to consumer UAV copters.

BACKGROUND

UAVs, and particularly UAV copters, for everyday consumers have traditionally been limited to entertainment as toys or as hobbyist collector items. Recently, however, UAV copters have been used for personal photography and videography. A UAV copter can be equipped with a portable power source and an image capturing apparatus, such as a camera or other types of sensors. For example, a photographer or a videographer can use a UAV copter to photograph or film athletes participating in outdoor activities when there are no overhead obstructions. The UAV copter can also be used to document special occasions, such as weddings, engagement proposals, and other activities that may occur in an open field. Photography and videography applications require instruments that are highly portable. However, conventional UAV copter tends to be bulky and difficult to transport.

A UAV copter tends to consume electrical charge of its battery pack at a high rate. The UAV copter can be equipped with a portable power source (e.g., a battery pack) and an image capturing apparatus, such as a camera. For example, a UAV copter carrying a high definition (HD) video camera utilizing a conventional battery pack may run out of charge within 30 minutes to one hour. A photography or videography session, under most scenarios, last for a much longer period of time than an hour. Hence, frequent recharging of the battery pack or swapping of the battery pack is a necessary inconvenience for many UAV copter applications.

Conventional UAV copters are manually controlled by an operator via a remote control device. This necessitates that the operator of a UAV copter and a target subject of a photo-shoot by the UAV copter cannot be the same person. A conventional UAV copter often alienates the operator from the activity that the operator is trying to capture. For example, an operator who is a friend of the bride and groom at a wedding, cannot participate in the wedding that the operator is trying to document. For another example, an operator who is capturing snowboarding stunts in a ski resort cannot be snowboarding while operating the UAV copter.

A conventional UAV copter, especially a conventional consumer UAV copter, is calibrated on the ground surface. The conventional UAV copter lifts-off when it receives an instruction to apply additional downward thrust from a remote controller coupled to the UAV copter. This process necessitates delays whenever the UAV copter lands but needs to re-launch within a short period time. For example, when filming athletes, a UAV copter may need to be in air upon a moment's notice. Slowly accelerating upwards from the ground surface may delay the filmmaking process and miss important moments that would otherwise be captured.

Conventional UAV copters are manually controlled by an operator via a remote control device. This necessitates that the operator of a UAV copter and a target subject of a photo-shoot by the UAV copter cannot be the same person. A conventional UAV copter often alienates the operator from the activity that the operator is trying to capture. For example, an operator who is a friend of the bride and groom at a wedding, cannot participate in the wedding that the operator is trying to document. For another example, an operator who is capturing snowboarding stunts in a ski resort cannot be snowboarding while operating the UAV copter.

BRIEF DESCRIPTION OF THE DRAWINGS

FIG. 2C is an example perspective view of the propeller driver of FIG. 2A at a resting state, in accordance with various embodiments.

FIG. 2D is an example perspective view of the propeller driver of FIG. 2A at an active state, in accordance with various embodiments.

FIGS. 12A-12D are illustrations of a UAV copter launching in mid-air, in accordance with various embodiment.

Figure 1:
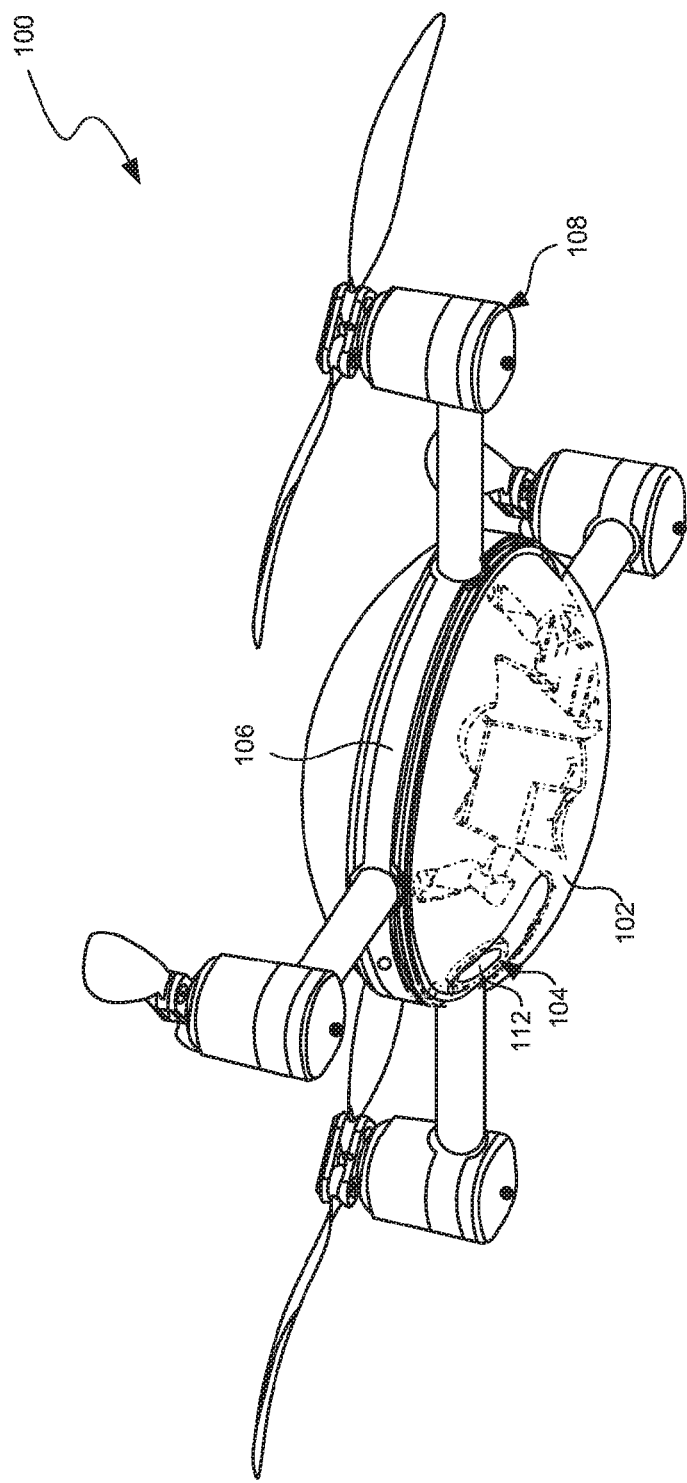
FIG. 1 is an example of a UAV copter, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Mechanism for Launching an UAV in Mid-Air

This disclosure includes a design of a UAV copter with mechanisms to launch the UAV copter in midair. For example, an operator can throw the UAV copter upwards when he/she wishes to launch the UAV copter. When the UAV copter is on, it can detect that it has been thrown by analyzing sensor readings from its sensors.

In some embodiments, the UAV copter can detect it has been thrown utilizing inertial sensors. The UAV copter can determine a downward acceleration or an upwards acceleration based on its inertial sensor readings, such as accelerometer readings. The UAV copter can turn on its propellers based on the acceleration readings. For example, a predetermined level of acceleration (e.g., a certain magnitude of upward or downward acceleration) can trigger the UAV copter to turn on its propellers. For another example, a predetermined change in level of acceleration can trigger the UAV copter to turn on its propellers, such as when an upwards acceleration changes to a downward acceleration. In other embodiments, the UAV copter can turn on its propellers based on velocity readings. For example, the UAV copter can turn its propellers when a predetermined velocity (e.g., a preset upward velocity or downward velocity) is reached.

In some embodiments, the UAV copter can detect it has been thrown by detecting its change in elevation. For example, the UAV copter can detect its change in elevation based on a global positioning system (GPS) module readings. The GPS module can provide z-axis coordinate of the UAV copter. For another example, the UAV copter can detect its change in elevation based on a barometer reading (e.g., change in ambient pressure).

In some embodiments, the UAV can detect it has been thrown by detecting motion via its one or more cameras. For example, an image processing module of the UAV copter can detect motion from the video feeds of the cameras by comparing consecutive frames. For another example, the UAV copter can use an autofocusing mechanism of the cameras to detect motion.

Upon detecting that it has been thrown, the UAV copter can calculate how to maintain itself in air. The UAV copter can determine how much power to supply to each of its propellers in order to rotate the UAV copter to a balanced state (e.g., capable of maintaining a constant elevation by substantially equal power to the propellers). The UAV copter can determine how much power to supply the propellers to maintain its flight above the surface ground at a predetermined absolute elevation or relative elevation from an operator device.

Third Person Camera Perspective Imaging

This disclosure includes a design of a UAV copter with mechanisms to automatically follow and track a human subject within its camera frame. Conventional photography captures observations via a first-person perspective (i.e., the UAV being the agent) of the photographer. Even conventional manually-controlled UAV copter adapted for photography captures observations from a first-person agent perspective of the photographer. The disclosed UAV copter can capture observations from a third-person perspective enabling the photographer, the target subject, and the operator of the UAV copter to be the same person. The disclosed mechanisms free the operator from having to control the UAVs in real-time and enable the operator to participate as a subject of the imaging (e.g., photography or videography).

In some embodiments, the disclosed UAV copter can operate in manual mode, semi-automatic mode, or fully automatic mode. In the fully automatic mode, the UAV copter can determine, in real-time, its own trajectory, elevation, yaw, pitch, and roll. In the semi-automatic mode, an operator of the UAV copter can control a subset of the trajectory, elevation, yaw, pitch, and roll through an operator device. For example, the operator can set the pitch and roll in real-time, and asynchronously set a preset trajectory and a preset elevation difference between the UAV copter and a target subject. The UAV copter can determine, in real-time, its own yaw and elevation in accordance with the operator's settings. This mode enables a one-handed interface to control the UAV copter. For example, if the operator is an athlete, such as a snowboarder, a one-handed is much more convenient to use while engaging in a sport activity (e.g., a snowboarder only needs to remove one glove to control the UAV copter). In the manual mode, an operator of the UAV copter can control the elevation, yaw, pitch, and roll of the UAV copter in real-time through an operator device.

Particularly, in the fully automatic mode and the semi-automatic mode, the disclosed UAV copter can locate its operator in a camera frame of its one or more cameras. Once the operator is captured in the camera frame, the disclosed UAV copter can follow and track the operator as the operator moves around on even or uneven terrain. The operator can be someone participating in an activity (e.g., snowboarding, surfing, sail boating, etc.) or an event (e.g., a wedding, a corporate event, an engagement proposal, etc.). In some embodiments, the disclosed UAV copter can be configured to hover at a preset elevation relative to the operator. The preset elevation can be configured by the operator through an interface on a remote operator device.

The disclosed UAV copter initially uses location information from sensors in the UAV copter and from sensors in a remote operator device to align the UAV copter to point its camera at the operator. The remote operator device, for example, can be a mobile phone or a wearable device, such as a wrist band device, a ring, an arm band device, or a pendant device. The UAV copter location information can be generated from one or more sensors, such as a barometer, a magnetometer, an accelerometer, a gyroscope, a Global Positioning System (GPS) module, or any combination thereof, in the UAV copter. The operator location information can be generated from one or more sensors, such as a barometer, a magnetometer, an accelerometer, a gyroscope, a GPS module, or any combination thereof, in the operator device. The operator location can be calculated using the sensor readings of the sensors in the operator device. This calculation can occur either in the UAV copter after receiving the sensor readings or in the operator device. In the latter case, the operator device can send the calculated operator location to the UAV copter. In some embodiments, the UAV copter can be coupled to multiple operator devices, each assumed to be on the operator's person. Sensor readings from the multiple operator devices can be used to refine the operator location information. Adjustments to the propeller drivers to target the operator are determined by the UAV copter based on the relative locations (e.g., three-dimensional coordinates) of the operator and the UAV copter.

In some embodiments, the UAV copter includes multiple cameras. For example, the UAV copter can include a sideway facing camera and a downward facing camera. Those cameras can be wide-angle cameras. In some embodiments, the sideway facing camera has a wider angle than the downward facing camera. In other embodiments, the downward facing camera has a wider angle than the sideway facing camera. When attempting to locate the operator into a camera frame of the cameras, the UAV copter can first use the downward facing camera, which can have a lower resolution, to generally locate the operator based on the UAV copter location information relative to the operator location information. Once the operator is observed and detected within the camera frame of the downward facing camera, a control system of the UAV copter can move the UAV copter sideways to place the operator into the camera frame of the sideway facing camera, which can have a higher resolution.

Once the operator is in the camera frame of the sideway facing camera, the control system of the UAV copter can maintain the operator within the camera frame using an image recognition module. For example, the image recognition module can locate the operator within the camera frame, and predict the motion of the operator to determine how to navigate the UAV copter such that the operator does not escape the camera frame.

Developer Toolkit to Provide Third-Party Control Applications to an Autonomous Drone Embodiments relate to a software developer toolkit (SDK) that exposes control functionalities and computer vision functionalities of an autonomous drone to a third-party application. For example, embodiments of the autonomous drone can self-pilot to follow and track its operator. The third-party application can facilitate the self-directing and self-piloting functionalities. In some embodiments, the third-party application can add additional intelligence to the autonomous drone or a control device (e.g., an operator device) of the autonomous drone.

Further, the SDK can enable access to sensor data from the autonomous drone and control devices (e.g., a mobile phone and a wearable tracker) of the autonomous drone. Specifically, the SDK enables the third-party application to implement context-based rules on the autonomous drone. The context-based rules interpret sensor data in real-time to determine whether one or more contextual conditions are met (e.g., the controlling user is jumping or the on-board battery is low) and determine what actions to take in response. The SDK also provides instructions to push executable instructions from a mobile device to the autonomous drone or another control device (e.g., the wearable tracker).

Folding Propellers for Profile Reduction

This disclosure includes a design of a UAV copter with reduced profile by folding the propellers of the UAV copter. The profile of the UAV copter is often defined by its structural frame and its propellers. For example, a UAV copter for consumer videography can be a quadcopter that is carried by a single person in a conventional backpack. Having minimal horizontal and vertical profiles are essential when fitting the UAV copter into such backpack.

In some embodiments, the UAV copter has a frame constructed to be maintained in parallel to the ground surface (e.g., a plane perpendicular the g-force vector of earth). Substantially near the vertices of the frame are motors with motor shafts for driving one or more propellers, the motor shafts being perpendicular to the frame. For example, two propellers can extend from hinge mechanisms substantially near and perpendicular to a motor shaft. The hinge mechanisms are mechanically coupled to the motor shaft. The hinge mechanisms themselves rotate with the motor shaft and allow independent rotation of the propellers around the respective hinge mechanisms. That is, each propeller can rotate around a hinge mechanism that is mechanically coupled to the motor shaft. The two hinge mechanisms can be positioned across from each other relative to the motor shaft.

At a resting state (i.e., when the motor shaft is not spinning), the two propellers can be folded towards one side. At an active state (i.e., when the motor shaft is spinning), the centrifugal force (i.e., the apparent force that draws a rotating body away from the center of rotation that is caused by the inertia of the body being constantly redirected) of the propellers will move the folded propellers to respective positions across from each other such that the propellers are rotationally symmetric relative to the motor shaft.

Other embodiments of the folding propellers can be implemented for the UAV copter. The UAV copter can include one or more motors. Each motor can have a motor shaft driving two or more propellers utilizing the propeller folding mechanism described above. In some embodiments, instead of folding sideways and maintaining a right angle with respect to the motor shaft, the propellers at the resting state can either be folded downwards alongside the motor shaft or folder upwards above the motor shaft. In other examples, the propellers can be folded together in one side as well as downwards or upwards.

Battery Swapping Mechanisms

This disclosure includes a design of a UAV copter with mechanisms to facilitate battery swaps. The disclosed UAV copter includes a hinge mechanism that pushes out a cover of a battery compartment to expose the battery compartment. The cover can be a top cover or a bottom cover of the UAV copter that exposes the battery compartment underneath the cover. In some embodiments, the cover can span across an entire underside or topside of the UAV copter. A button or a lever can be used to unlock the hinge mechanism and thus open the cover. Once unlocked, the cover pushes out and away from the battery compartment. In various embodiments, the cover is pushed out via multiple rods that are attached to the cover and the sides of the battery compartment (e.g., the frame of the UAV copter). The cover remains attached to the UAV copter when the battery compartment is exposed.

The battery compartment can be configured to receive a battery pack containing one or more batteries. In some embodiments, the battery compartment can be configured to receive multiple battery packs. In some embodiments, the battery compartment has a locking mechanism that locks in the battery pack after the battery pack is pushed into the battery compartment. This is advantageous when the battery compartment is exposed from underneath the UAV copter and the battery pack is installed upwards into the battery compartment. The locking mechanism prevents the battery pack from falling out of the UAV copter when installing the battery pack.

The disclosed UAV copter includes a backup battery coupled to the control system. Upon detecting that the battery compartment is being opened or that the battery pack has been taken out, a power circuitry automatically routes power from the backup battery to the control system. The backup battery is sufficient to maintain its charge and to power the control system for a short duration, such as 60 seconds. This minimal power requirement allows for the form factor and weight of the backup battery to be much smaller than the main battery pack.

Without this backup battery, delay caused by battery replacement is not just the time needed to replace the battery, but also the time needed to reboot and recalibrate the control system of the UAV copter. The backup battery prevents the UAV copter from rebooting or needing to recalibrate due to power disruption. The charge of the backup battery lasts for a sufficient duration for an ordinary person to be able to replace the main battery pack. The backup battery can be recharged by the main battery pack (i.e., the primary power source) such that the replacement of backup battery is mostly unnecessary for the lifetime of the UAV copter.

Folding Propellers

FIG. 1 is an example of a UAV copter 100, in accordance with various embodiments. The UAV copter 100 includes a bottom cover 102 (where the interior components are shown with dashed lines), a sensor compartment 104, a support structure 106 (including an internal frame and an external shell), and one or more propeller drivers 108. The sensor compartment 104 is adapted to store one or more sensors 112, such as a photo camera or a video camera. The sensors 112 can capture images or other observations and store it on a local memory device (not shown). The UAV copter 100 can also stream the captured images or other observations to a nearby device via a communication device (not shown).

The active components described for the UAV copter 100 may operate individually and independently of other active components. Some or all of the active components can be controlled, partially or in whole, remotely or via an intelligence system (not shown) in the UAV copter 100. The separate active components can be coupled together through one or more communication channels (e.g., wireless or wired channel) to coordinate their operations. Some or all of the components may be combined as one component or device. A single component may be divided into subcomponents, each sub-component performing separate functional part or method step(s) of the single component. The UAV copter 100 may include additional, fewer, or different components for various applications.

In some embodiments, the UAV copter 100 has the support structure 106 constructed to be maintained in parallel to the ground surface (e.g., a plane perpendicular the g-force vector of earth) at steady state flight. Substantially near the outer perimeter of the support structure 106 are the propeller drivers 108 for driving one or more propellers with respective motor shafts of the propeller drivers 108. Each of the propeller drivers 108 can include at least two propellers driven by a motor.

Figure 2A:
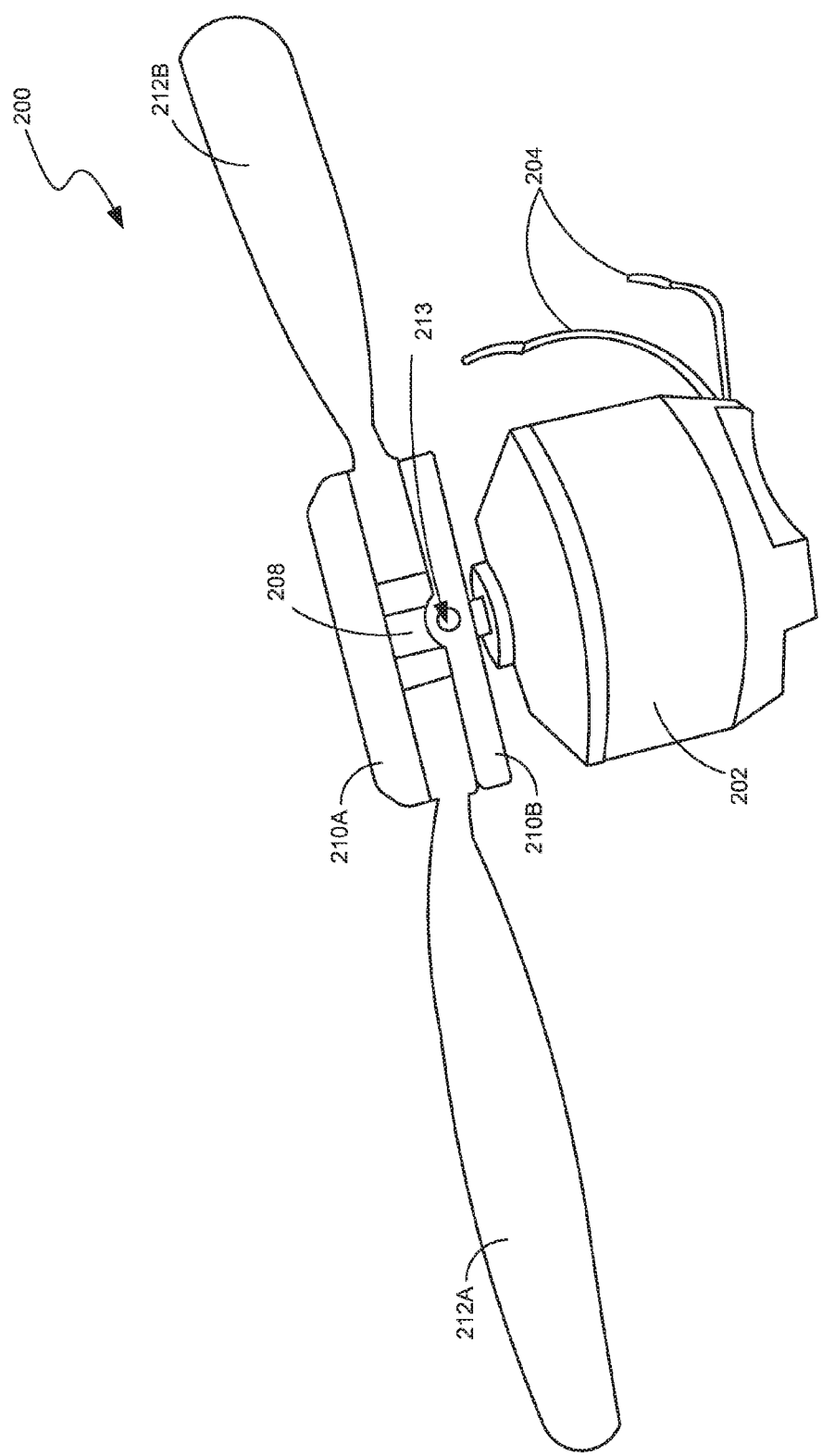
FIG. 2A is an example of a propeller driver for a UAV copter, in accordance with various embodiments.
Figure 2B:
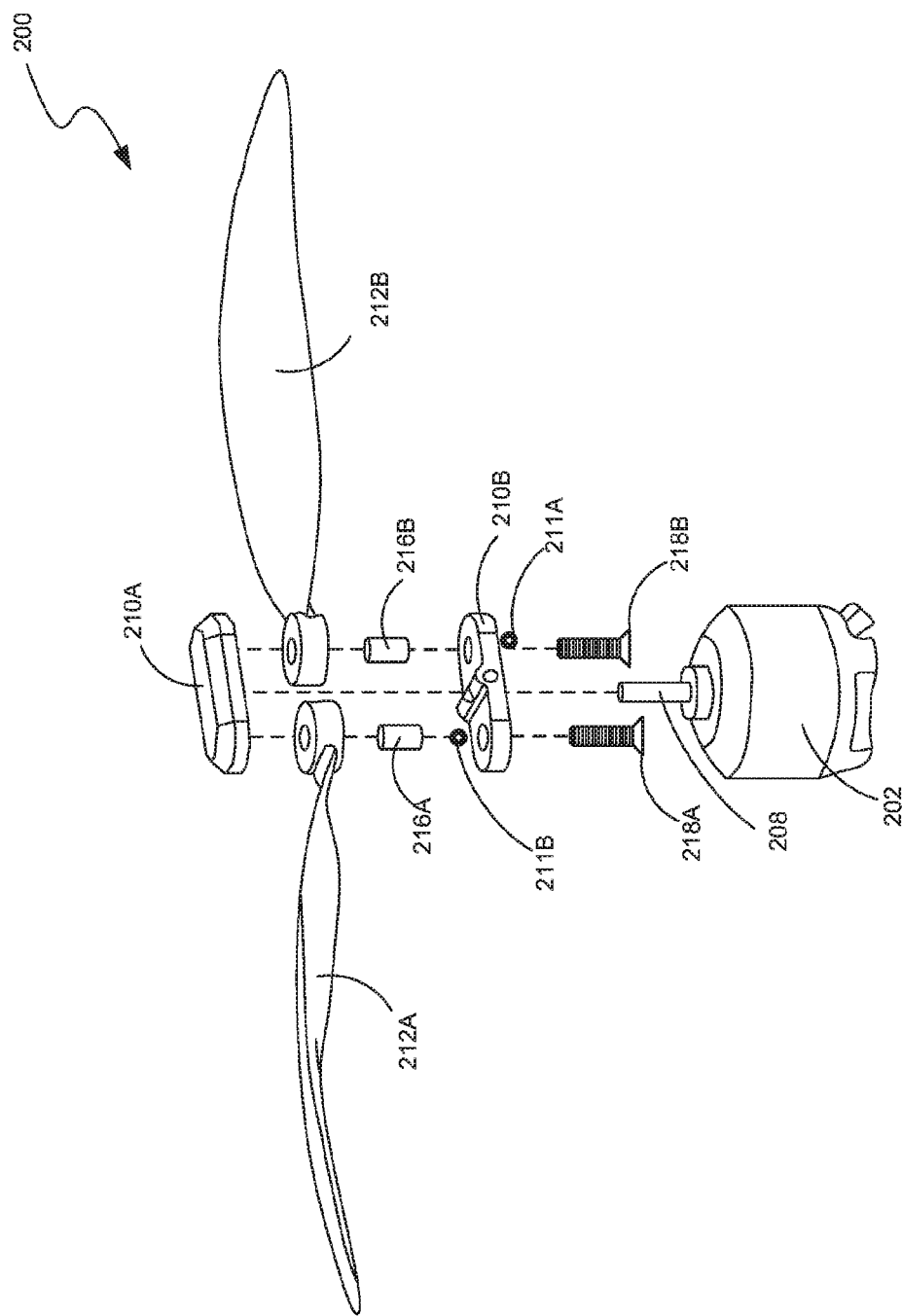
FIG. 2B is an exploded components view of the propeller driver of FIG. 2A, in accordance with various embodiments.

FIG. 2A is an example of a propeller driver 200 for a UAV copter, in accordance with various embodiments. FIG. 2B is an exploded components view of the propeller driver 200 of FIG. 2A, in accordance with various embodiments.

The propeller driver 200 includes a motor 202, such as a direct current (DC) motor. The motor 202 can be driven and controlled by a control system (not shown) of the UAV copter, for example, through power wires 204. A motor shaft 208 extends from the motor 202. For example, the motor shaft 208 can extend from the center of the motor 202. The motor shaft 208 can be mechanically coupled to a top plate 210A and a bottom plate 210B (collectively as the "plates 210") that together sandwiches propellers (e.g., a first propeller 212A and a second propeller 212B, collectively as the propellers 212). The motor shaft 208 is attached to the plates 210 in such a way that, when the motor shaft 208 is rotated (e.g., around the axis of the motor shaft 208 by the motor 202), the plates 210 rotate with the motor shaft 208. The plates 210 can be metallic, wooden, carbon-based, plastic, fiber-based, other composite materials, or any combination thereof. The plates 210 can take the form of a circle, an oval, a rectangle, a square, a triangle, or other rotationally symmetric shapes.

Various methods of mechanically coupling the plates 210 and the motor shaft 208 together can be done. In some embodiments, the plates 210 can be secured onto the motor shaft 208 by inserting one or more set screws (e.g., a set screw 211A and a set screw 211B, collectively the "set screws 211") through one or more holes 213 in at least one of the plates 210 (e.g., the bottom plate 210B) to the motor shaft 208.

In some embodiments, the motor shaft 208 can be threaded with a screw pattern. As an alternative to the set screws 211 or in addition to the set screws 211, the motor shaft 208 can be coupled to the plates 210 by winding the motor shaft 208 into corresponding threaded holes in the plates 210. The top plate can have a one-sided threaded hole while the bottom plate can have a through-hole that is threaded. The threaded holes may be patterned in such a way that rotation of the motor shaft 208 in the direction that creates lift through the propellers 212 does not unscrew/unwind the motor shaft 208 from the threaded holes. Use of the set screws 211 or threading the motor shaft 208 is advantageous because it eliminates the need for a top cap nut, and thus further reducing the vertical profile taken up by the propeller driver 200.

In various embodiments, the motor shaft 208 is directly mechanically attached to only one of the plates 210. Both of the plates 210 can still be mechanically coupled to the motor shaft 208 if the plates 210 are mechanically coupled to each other. For example, the plates 210 can be mechanically coupled to each other via rods 216 (e.g., a rod 216A and a rod 216B, collective the "rods 216"). The rods 216 can be hollow tubes or solid cylinders. The rods 216 can be round cylinders or other elongated round shapes. In some embodiments, the rods 216 can be attached to both of the plates 210 via a screw 218A and a screw 218B. In some embodiments, the rods 216 can be attached by tightly fitting into holes in the plates 210. In some embodiments, the rods 216 can be threaded and can wind into threaded holes in the plates 210.

The propellers 212 has a blade section and a base section. The blade section is a type of fan that can convert rotational motion into thrust. For example, a pressure difference is produced between the forward and rear surfaces of an airfoil-shaped blade section, and air is accelerated behind the blade section. The base section is where the propellers 212 are mechanically coupled to the plates 210 and hence indirectly to the motor shaft 208.

For example, the first propeller 212A may be sandwiched between the top plate 210A and the bottom plate 210B. The rod 216A may be attached to the top plate 210A and the bottom plate 210B. The base section of the first propeller 212A includes a hole. The rod 216A runs through that hole. This setup enables the rod 216A to secure the first propeller 212A between the plates 210. This setup also enable the first propeller 212A to freely rotate around the rod 216A (e.g., via the hole in the first propeller 212A). Similarly, the second propeller 212B may be sandwiched between the plates 210 as well. The rod 216B may be attached to the plates 210 in a similar fashion as the rod 216A. The second propeller 212B is able to freely rotate around the rod 216B.

FIG. 2C is an example perspective view of the propeller driver 200 of FIG. 2A at a resting state, in accordance with various embodiments. In the resting state, the motor shaft 208 is not rotating. Likewise, the plates 210 are not rotating neither. When an operator of the UAV copter wants to store the UAV copter in a backpack, the operator can fold at least one of the propellers 212 (e.g., the first propeller 212A) to the side towards another propeller (e.g., the second propeller 212B). The operator can also fold all of the propellers together to one side. For example, the operator can fold the first propeller 212A by rotating the first propeller 212A around the rod 216A and the second propeller 212B around the rod 216B.

The ability to fold at least one of the propellers 212 provides a reduced profile for the UAV copter. For a UAV copter that has multiple motors, this horizontal size reduction may apply to every location with a propeller driver (e.g., by folding a propeller that otherwise extends outside of a UAV copter frame to be inside the frame). In the case of a quadcopter, propellers can be folded in from every corner with a propeller driver, thus minimizing the horizontal profile of the quadcopter at every corner.

FIG. 2D is an example perspective view of the propeller driver 200 of FIG. 2A at an active state, in accordance with various embodiments. In the active state, the motor shaft 208 is rotating and hence the plates 210 are rotating as well. The rotational movement of the plates 210 causes the propellers 212 to rotate as well, and thus move away from the motor shaft 208. As a result, the first propeller 212A, which has been folded towards the second propeller 212B, extends back out in the direction opposite from the second propeller 212B relative to the motor shaft 208. This movement that aligns the propellers 212 to their proper positions is caused by the apparent centrifugal force resulting from the rotational motion of the plates 210. The centrifugal force is an apparent force that draws a rotating body away from the center of rotation that is caused by the inertia of the body being constantly redirected. The resulting positions of the propellers 212 after this alignment movement place the center of gravity of each propeller farthest away from the motor shaft 208.

In some embodiments, when putting the UAV copter into a backpack, some of the propellers 212 can naturally fold in upon contact with the backpack. When launching the UAV copter, the coupling of the alignment movement and the rotation of the motor shaft 208 allows an operator to quickly launch the UAV copter without needing to perform any alignment steps. Hence, the folding and natural unfolding of the propellers 212 advantageously provide a profile reduction mechanism that does not increase the complexity for operating the UAV copter.

Battery Swapping Mechanism

Figure 3:
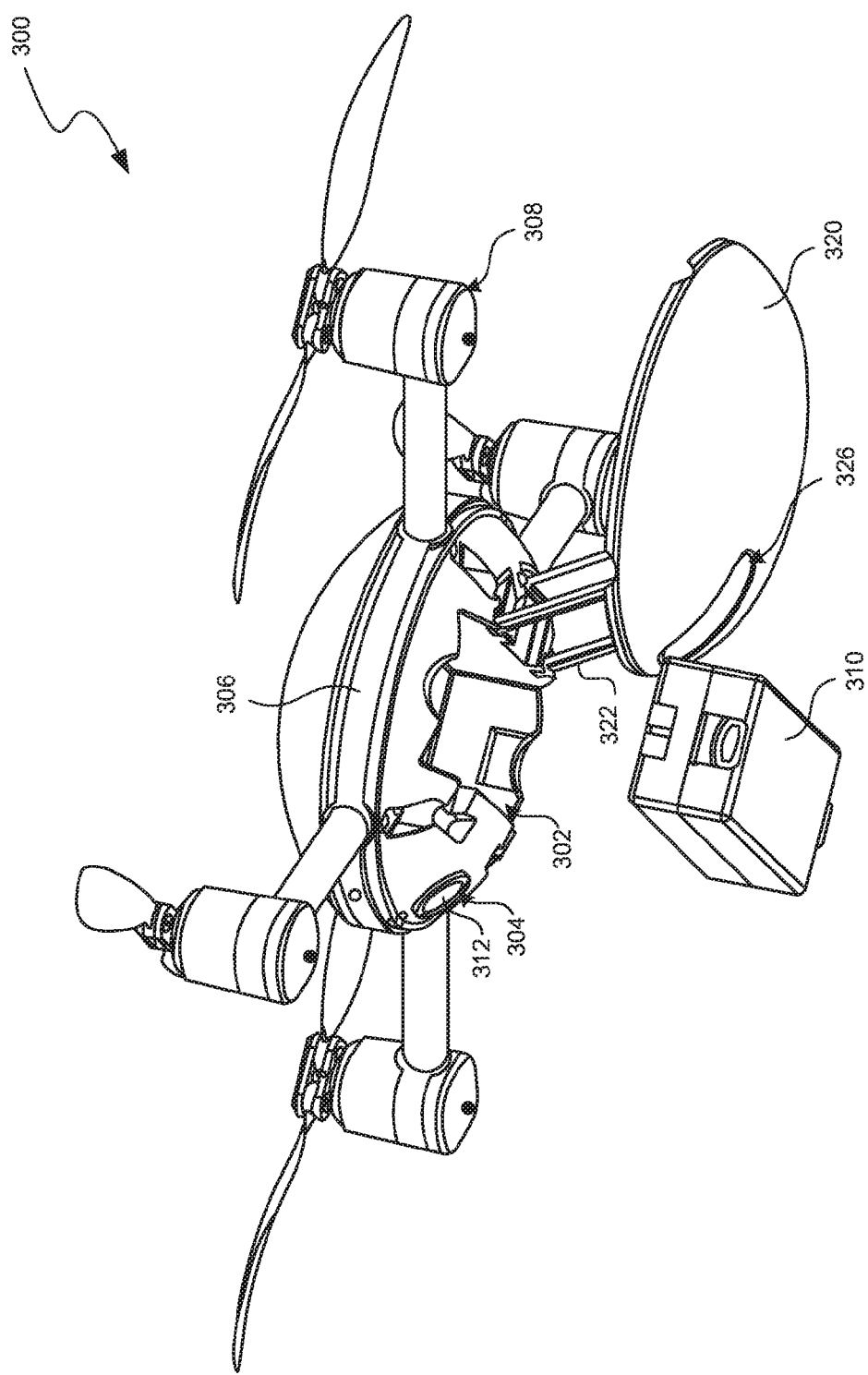
FIG. 3 is an example of a UAV copter, in accordance with various embodiments.

FIG. 3 is an example of a UAV copter 300, in accordance with various embodiments. The UAV copter can be a waterproof or water resistant UAV copter. The UAV copter 300 includes a battery compartment 302, a sensor compartment 304, a support structure 306 (including an internal frame and an external shell), and one or more propeller drivers 308. The battery compartment 302 is adapted to store one or more portable power sources, such as a battery pack 310. The battery pack 310 can include one or more batteries, such as lithium polymer batteries. The sensor compartment 304 is adapted to store one or more sensors 312, such as a photo camera or a video camera. The sensors 312 can capture images or other observations and store it on a local memory device (not shown). The UAV copter 300 can also stream the captured images or other observations to a nearby device via a communication device (not shown).

In some embodiments, the UAV copter 300 has the support structure 306 constructed to be maintained in parallel to the ground surface (e.g., a plane perpendicular the g-force vector of earth) at steady state flight. Substantially near the vertices of the support structure 306 are the propeller drivers 308 for driving one or more propellers with respective motor shafts of the propeller drivers 308. Each of the propeller drivers 308 can include at least two propellers driven by a motor. The two propellers can be positioned across from each other relative to a motor shaft of the motor.

The battery compartment 302 is protected by a cover 320. Multiple rods 322 are rotatably attached (i.e., able to rotate at the points of attachment) between the cover 320 and the support structure 306 that forms the sides of the battery compartment 302. The rods 322 can be composed of any substantially rigid material, such as metal, wood, plastic, or a combination thereof. For example, each of the rods 322 can be attached to the cover 320 and the support structure 306 with a hinge, a bearing, a pivot, or other mechanism that enables limited rotational movement, on at least one end of the rod. In some embodiments, the rod can rotate from both ends. A locking member, when engaged, can prevent the cover 320 from exposing the battery compartment 302. When the cover 320 is closed (i.e., not exposing the battery compartment 302), the rods 322 can be hidden within the battery compartment 302. When the cover 320 is closed, the rods 322 can remain horizontal with respect to the ground and/or parallel to the cover 320. The weight of the rods 322 and the battery compartment 302 are designed to be balanced such that each propeller driver provides a substantial equal thrust when lifting the UAV copter 300 in air.

An opener mechanism (e.g., a button or a lever) can be used to disengage the locking member and thus open the cover 320. When the locking member disengages, the cover 320 can slide sideways and away from the battery compartment 302. The rods 322 control the movement of the cover 320 as it slides out to expose the battery compartment 302. Once unlocked, the cover 320 can be slid out by a human operator pulling at the cover 320, by residual momentum of the opener mechanism, by the weight of the cover 320, due to a spring pushing against or pulling the cover 320, or other hydraulic or pneumatic mechanisms coupled to or embedded within the rods 322. The cover 320 remains attached to the UAV copter 300 when the battery compartment 302 is exposed. The lips of the cover 320 can include a water proof material to hermetically seal an underside of the UAV copter 300 or at least the battery compartment 302, when the cover 320 is closed.

The cover 320 can span the entire bottom surface of the UAV copter. The cover 320 can include a window 326 that allows the sensors 312 to capture images. The window 326 can be an opening in the cover 320 or a transparent portion of the cover 320.

Figure 4:
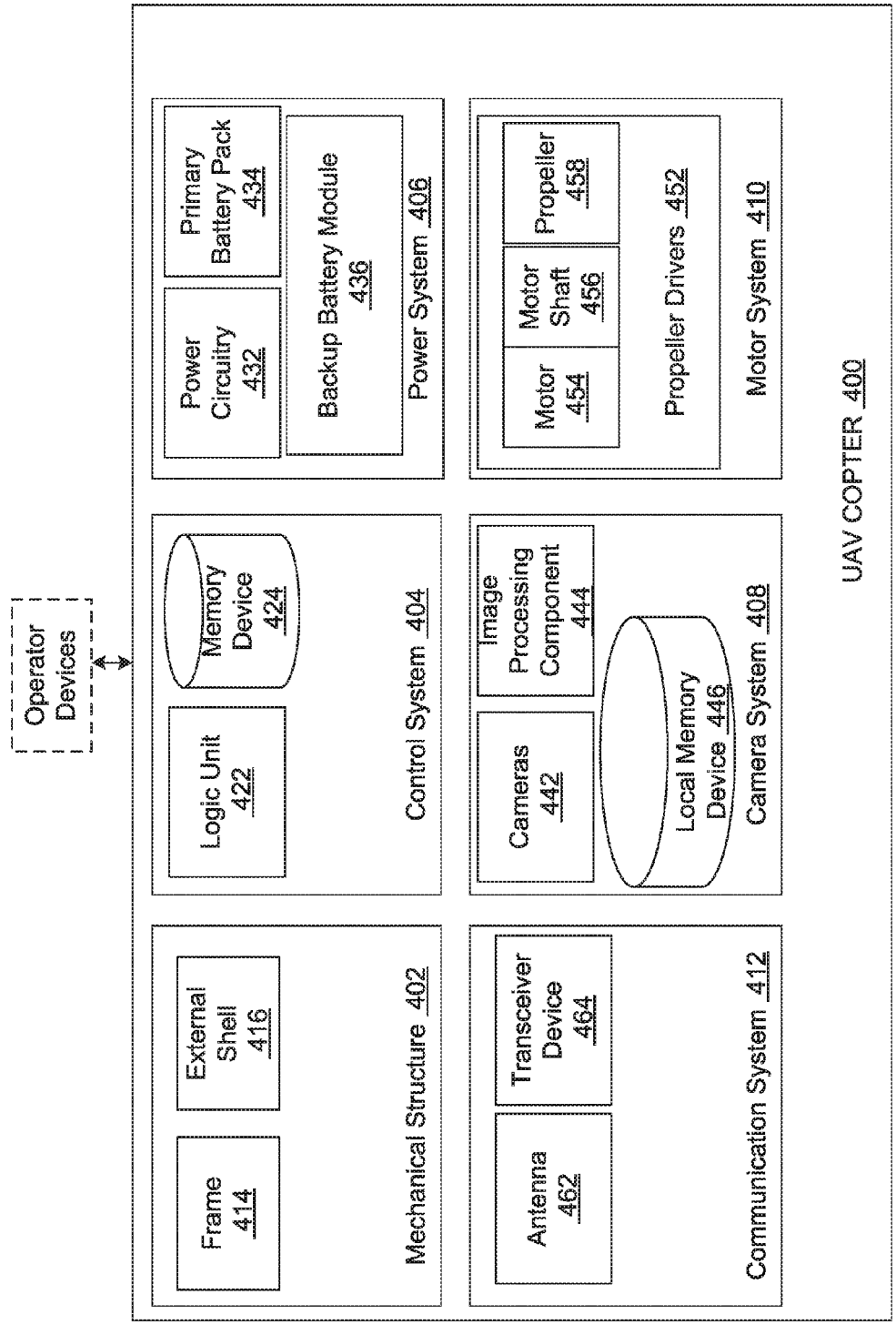
FIG. 4 is a block diagram of a UAV copter, in accordance with various embodiments.

FIG. 4 is a block diagram of a UAV copter 400 (e.g., the UAV copter 300 of FIG. 3), in accordance with various embodiments. The UAV copter 400 includes a mechanical structure 402 (e.g., the support structure 306 of FIG. 3), a control system 404, a power system 406, a camera system 408, a motor system 410, and a communication system 412. The UAV copter 400 can be controlled by one or more operator devices (shown as dashed boxes). The operator devices can include, for example, a remote control, a mobile device, a wearable device, and etc. The mechanical structure 402 includes a frame 414 and an external shell 416. The external shell 416 can include the cover 320 of FIG. 3. The external shell 416 surrounds and protects the UAV copter 400.

In various embodiment, the external shell 416 is hermetically sealed to waterproof the UAV copter 400, including sealing the control system 404, and thus prevent liquid (e.g., water) or snow from entering the power system 406 and the communication system 412, when the UAV copter 400 is completely or partially immersed in liquid or snow. While a camera lens of the camera system 408 can be exposed on the external shell 416, the rest of the camera system 408 can also be hermetically sealed within the external shell 416. In some embodiments, only the motor system 410 of the UAV copter 400 is exposed outside of the external shell 416. The motor system 410 can be processed to be waterproof as well, without being sealed within the external shell 416. The above hermetical sealing of component systems of the UAV copter 400 and processing of the motor system 410 advantageously provide a waterproof UAV copter to photo-shoot and take video for athletes participating in adventure sports, such as surfing, sail boating, or snowboarding. In some embodiments, the mechanical structure 402 includes one or more floatation devices (not shown) to increase the buoyancy of the UAV copter 400 such that when it lands on water it will not sink.

The control system 404 can be implemented as electronic circuitry including a logic unit 422, such as a processor, an application specific integrated circuit (ASIC), a field programmable gate array (FPGA), or any combination thereof. The control system 404 can also include a memory device 424, such as a non-transitory computer readable storage medium. The memory device 424 can store executable instructions for controlling the UAV copter 400. The executable instructions can be executed by the logic unit 422. The control system 404 can receive instructions remotely from or send information to an operator device via the communication system 412.

The power system 406 includes at least a power circuitry 432, a primary battery pack 434, and a backup battery module 436. When the UAV copter 400 is powered on, the primary battery pack 434 supplies power to the control system 404, the camera system 408, the motor system 410, and the communication system 412, whenever power is needed. The primary battery pack 434 also supplies power to recharge the backup battery module 436. In some embodiments, the backup battery module 436 is embedded within the UAV copter 400 and is not removable or replaceable.

The power circuitry 432 can be configured to regulate the power drawn from the primary battery pack 434. The power circuitry 432 can be configured to monitor the charge level of the primary battery pack 434. The power circuitry 432 can further be configured to detect potential fault and estimate a lifespan of the primary battery pack 434 and/or the backup battery module 436. The power circuitry 432 can be configured to detect a disruption of power from the primary battery pack 434 (e.g., when the primary battery pack 434 is removed from the UAV copter 400 or when the primary battery pack 434 is out of charge). The power circuitry 432 can be configured to detect opening of a battery compartment in the mechanical structure 402. The power circuitry 432 can route power from the backup battery module 436 to the control system 404 upon detecting the disruption of power or the opening of the battery compartment. The backup battery module 436 is able to maintain sufficient charge to power the control system 404 for a short duration, such as 60 seconds. In embodiments, the backup battery module 436 is only used to power the control system 404 in absence of the primary battery pack 434, but not to power other systems in the UAV copter 400.

The camera system 408 includes one or more cameras 442 and an image processing component 444. The camera system 408 can include a local memory device 446 to store multimedia observations made by the cameras 442, including photos, audio clips (e.g., from cameras with microphones), and/or videos. The camera system 408 can also have access to the memory device 424. In some embodiments, the local memory device 445 is the memory device 424. The image processing component 444 can be implemented in the form of a processor, an ASIC, a FPGA, or other logical circuitry. The image processing component 444 can be implemented by the logic unit 422 in the control system 404. For example, the image processing component 444 can be implemented as a set of executable instructions stored in the memory device 424. Each of the cameras 442 may include sub-components other than image capturing sensors, including auto-focusing circuitry, ISO adjustment circuitry, and shutter speed adjustment circuitry, etc.

The image processing component 444 can be configured to detect objects in a camera frame of the cameras 442. The image processing component 444 can perform other tasks, such as image filtering, image calling, video frame sampling, and other image processing, audio processing, and/or video processing techniques.

The motor system 410 includes one or more propeller drivers 452. Each of the propeller drivers 452 includes a motor 454, a motor shaft 456, and a propeller 458. The propeller drivers 452 can be controlled by the control system 404 and powered by the power system 406.

The communication system 412 includes an antenna 462 and a transceiver device 464. The transceiver device 464 can include any of modulators, de-modulators, encoders, decoders, encryption modules, decryption modules, amplifiers, and filters. The communication system 412 can receive control instructions (e.g., navigational mode toggling, trajectory instructions, general settings, etc.) from one of the operator devices. The communication system 412 can send reporting of status of the UAV copter 400 to one of the operator devices. The communication system 412 further enables the camera system 408 to send the multimedia content it captures to one of the operator devices.

The active components described for the UAV copter 300 and/or the UAV copter 400 may operate individually and independently of other active components. Some or all of the active components can be controlled, partially or in whole, remotely or via an intelligence system in the UAV copter 300 and/or the UAV copter 400. The separate active components can be coupled together through one or more communication channels (e.g., wireless or wired channel) to coordinate their operations. Some or all of the components may be combined as one component or device. A single component may be divided into sub-components, each sub-component performing separate functional part or method step(s) of the single component. The UAV copter 300 and/or the UAV copter 400 may include additional, fewer, or different components for various applications.

Figure 5:
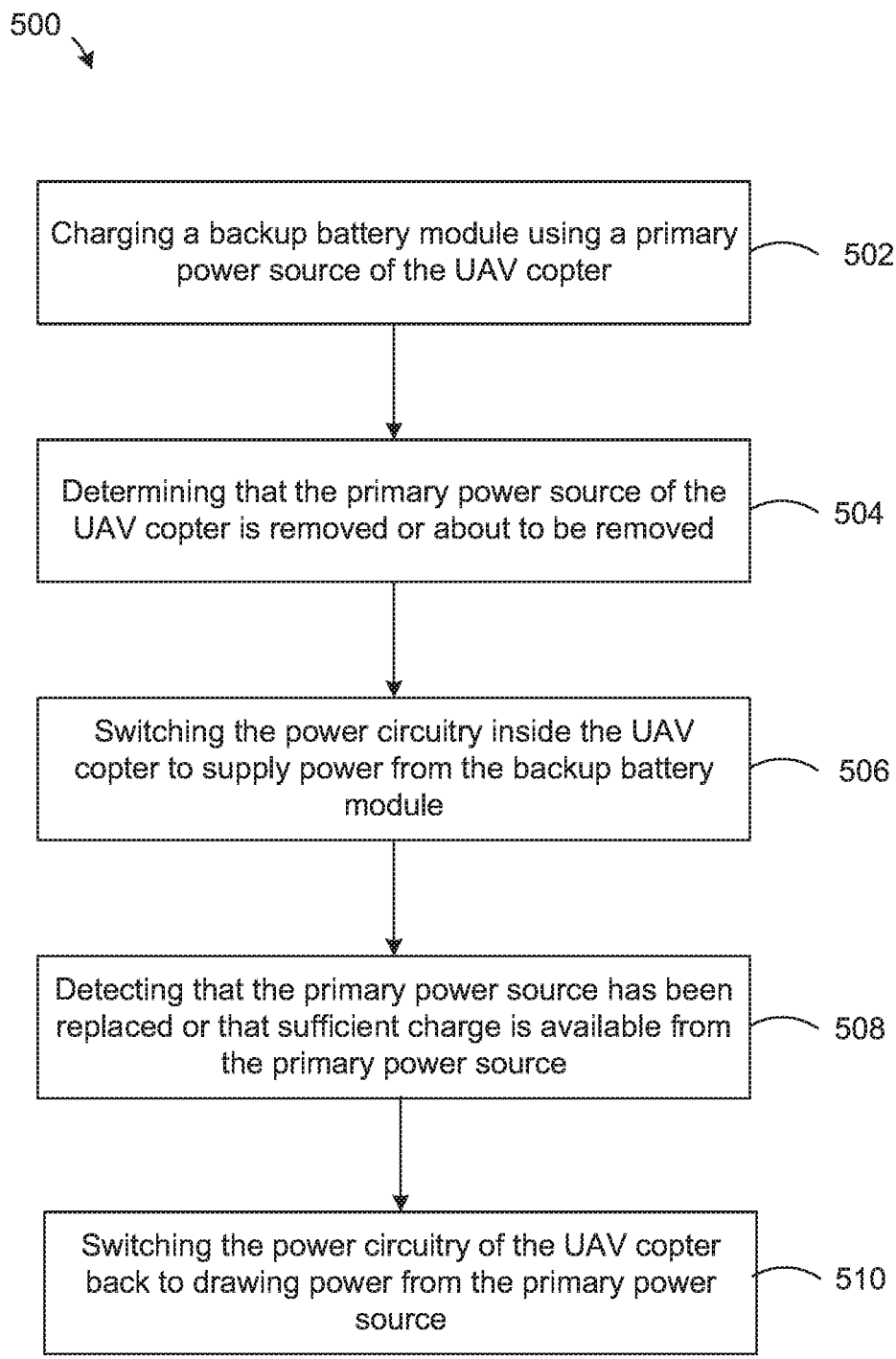
FIG. 5 is a flow chart of a method of operating a power system of a UAV copter, in accordance with various embodiment.

FIG. 5 is a flow chart of a method 500 of operating a power system of a UAV copter, in accordance with various embodiments. The power system can be the power system 406 of FIG. 4. The UAV copter can be the UAV copter 300 of FIG. 3 or the UAV copter 400 of FIG. 4.

The method 500 includes step 502 of charging a backup battery module (e.g., the backup battery module 436 of FIG. 4) using a primary power source (e.g., the primary battery pack 434 of FIG. 4) of the UAV copter. Then at step 504, the power system can determine that the primary power source of the UAV copter is removed or about to be removed. Step 504 can include detecting that a cover of a battery compartment of the UAV copter is open. Step 504 can also include detecting a disruption of power supplied from the primary power source.

In response to the determination at step 504, the power system can switch the power circuitry inside the UAV copter to supply power from the backup battery module, instead of the primary power source, at step 506. The power system can disable the motor system (e.g., the motor system 410 of FIG. 4) and the communication system (e.g., the communication system 412 of FIG. 4) of the UAV copter, but nevertheless supplies power to the control system (e.g., the control system 404 of FIG. 4) such that navigational configurations and/or states of the control system need not to be reinitiated or recalibrated.

At step 508, the power system can detect that the primary power source has been replaced or that sufficient charge is available from the primary power source. In response to step 508, the power system can switch the power circuitry of the UAV copter back to drawing power from the primary power source at step 510.

While processes or blocks are presented in a given order in FIG. 5, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Third Person Camera Perspective Imaging

Figure 6:
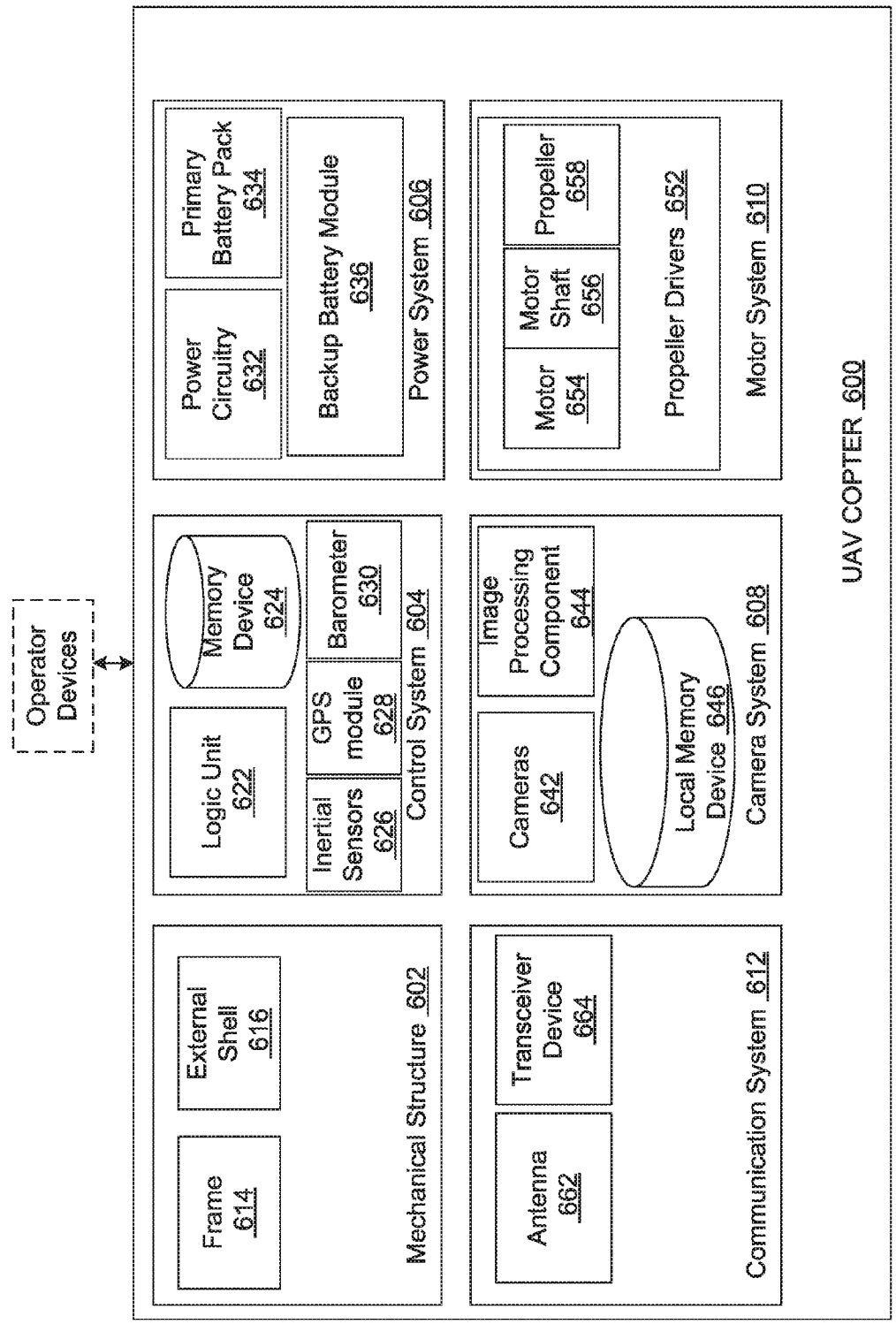
FIG. 6 is a block diagram of a UAV copter, in accordance with various embodiments.

FIG. 6 is a block diagram of a UAV copter 600 (e.g., the UAV copter 100 of FIG. 1), in accordance with various embodiments. The UAV copter 600 includes a mechanical structure 602 (e.g., the support structure 106 of FIG. 1), a control system 604, a power system 606, a camera system 608, a motor system 610, and a communication system 612. The UAV copter 600 can be controlled by one or more operator devices (shown as dashed boxes). For example, the operator devices can be the operator device 700 of FIG. 7. The operator devices can include, for example, a remote control, a mobile device, a wearable device, and etc. In some embodiments, one operator device is for tracking the location of the operation, and another operator device is for controlling the UAV copter 600. The operator device for controlling the UAV copter 600 can also be used to supplement the location tracking of the operator.

The mechanical structure 602 includes a frame 614 and an external shell 616. The external shell 616 can include the bottom cover 102 of FIG. 1. The external shell 616 surrounds and protects the UAV copter 600. In various embodiment, the external shell 616 is hermetically sealed to waterproof the UAV copter 600, including sealing the control system 604, and thus prevent liquid (e.g., water) or snow from entering the power system 606 and the communication system 612, when the UAV copter 600 is completely or partially immersed in liquid or snow. While a camera lens of the camera system 608 can be exposed on the external shell 616, the rest of the camera system 608 can also be hermetically sealed within the external shell 616. In some embodiments, only the motor system 610 of the UAV copter 600 is exposed outside of the external shell 616. The motor system 610 can be processed to be waterproof as well, without being sealed within the external shell 616. The above hermetical sealing of component systems of the UAV copter 600 and processing of the motor system 610 advantageously provide a waterproof UAV copter to photo-shoot and take video for athletes participating in adventure sports, such as surfing, sail boating, or snowboarding.

The control system 604 can be implemented as electronic components and/or circuitry including a logic unit 622, such as a processor, an application specific integrated circuit (ASIC), a field programmable gate array (FPGA), or any combination thereof. The control system 604 can also include a memory device 624, such as a non-transitory computer readable storage medium. The memory device 624 can store executable instructions for controlling the UAV copter 600. The executable instructions can be executed by the logic unit 622. The control system 604 can receive instructions remotely from or send information to an operator device via the communication system 612.

The control system 604 can include one or more sensors, such as inertial sensors 626, a GPS module 628, and a barometer 630. The inertial sensors 626 provide navigational information, e.g., via dead reckoning, including at least one of the position, orientation, and velocity (e.g., direction and speed of movement) of the UAV copter 600. The inertial sensors 626 can include one or more accelerometers (providing motion sensing readings), one or more gyroscopes (providing rotation sensing readings), one or more magnetometers (providing direction sensing), or any combination thereof. The inertial sensors 626 can provide up to three dimensions of readings, such as via 3-axis accelerometer, 3-axis gyroscope, and 3-axis magnetometer. The GPS module 628 can provide three-dimensional coordinate information of the UAV copter 600 via communication with one or more GPS towers, satellites, or stations. The barometer 630 can provide ambient pressure readings used to approximate elevation level (e.g., absolute elevation level) of the UAV copter 600.

The power system 606 includes at least a power circuitry 632, a primary battery pack 634, and a backup battery module 636. When the UAV copter 600 is powered on, the primary battery pack 634 supplies power to the control system 604, the camera system 608, the motor system 610, and the communication system 612, whenever power is needed. The primary battery pack 634 also supplies power to recharge the backup battery module 636. In some embodiments, the backup battery module 636 is embedded within the UAV copter 600 and is not removable or replaceable.

The power circuitry 632 can be configured to regulate the power drawn from the primary battery pack 634. The power circuitry 632 can be configured to monitor the charge level of the primary battery pack 634. The power circuitry 632 can further be configured to detect potential fault and estimate a lifespan of the primary battery pack 634 and/or the backup battery module 636. The power circuitry 632 can be configured to detect a disruption of power from the primary battery pack 634 (e.g., when the primary battery pack 634 is removed from the UAV copter 600 or when the primary battery pack 634 is out of charge). The power circuitry 632 can be configured to detect opening of a battery compartment in the mechanical structure 602. The power circuitry 632 can route power from the backup battery module 636 to the control system 604 upon detecting the disruption of power or the opening of the battery compartment. The backup battery module 636 is able to maintain sufficient charge to power the control system 604 for a short duration, such as 60 seconds. In embodiments, the backup battery module 636 is only used to power the control system 604 in absence of the primary battery pack 634, but not to power other systems in the UAV copter 600.

The camera system 608 includes one or more cameras 642 and an image processing component 644. The camera system 608 can include a local memory device 646 to store multimedia observations made by the cameras 642, including photos, audio clips (e.g., from cameras with microphones), and/or videos. The camera system 608 can also have access to the memory device 624. In some embodiments, the local memory device 646 is the memory device 624. The image processing component 644 can be implemented in the form of a processor, an ASIC, a FPGA, or other logical circuitry. The image processing component 644 can be implemented by the logic unit 622 in the control system 604. For example, the image processing component 644 can be implemented as a set of executable instructions stored in the memory device 624. Each of the cameras 642 may include sub-components other than image capturing sensors, including auto-focusing circuitry, ISO adjustment circuitry, and shutter speed adjustment circuitry, etc.

The image processing component 644 can be configured to detect obstacles within the UAV copter 600's trajectory. The image processing component 644 can also be configured to detect a target subject, such as the owner of the UAV copter 600. In some embodiments, the image processing component 644 can track multiple target subjects. The image processing component 644 can perform other tasks, such as image filtering, image calling, video frame sampling, and other image processing, audio processing, and/or video processing techniques. The image processing component 644 can also predict the trajectory of the obstacles or the target subject. In some embodiments, an operator device that is expected to be possessed by the target subject can emit certain light or visual signals to render the target subject detectable by the camera system 608 to help locate the target subject.

The motor system 610 includes one or more propeller drivers 652. Each of the propeller drivers 652 includes a motor 654, a motor shaft 656, and a propeller 658. The propeller drivers 652 can be controlled by the control system 604 and powered by the power system 606.

The communication system 612 includes an antenna 662 and a transceiver device 664. The transceiver device 664 can include any of modulators, de-modulators, encoders, decoders, encryption modules, decryption modules, amplifiers, and filters. The communication system 612 can receive control instructions (e.g., navigational mode toggling, trajectory instructions, general settings, etc.) from one of the operator devices. The communication system 612 can send reporting of status of the UAV copter 600 to one of the operator devices. The communication system 612 further enables the camera system 608 to send the multimedia content it captures to one of the operator devices.

The active components described for the UAV copter 100, the UAV copter 600, and/or the operator device 700 may operate individually and independently of other active components. Some or all of the active components can be controlled, partially or in whole, remotely or via an intelligence system in the UAV copter 100, the UAV copter 600, and/or the operator device 700. The separate active components can be coupled together through one or more communication channels (e.g., wireless or wired channel) to coordinate their operations. Some or all of the components may be combined as one component or device. A single component may be divided into sub-components, each sub-component performing separate functional part or method step(s) of the single component. The UAV copter 100, the UAV copter 600, and/or the operator device 700 may include additional, fewer, or different components for various applications.

Figure 7:
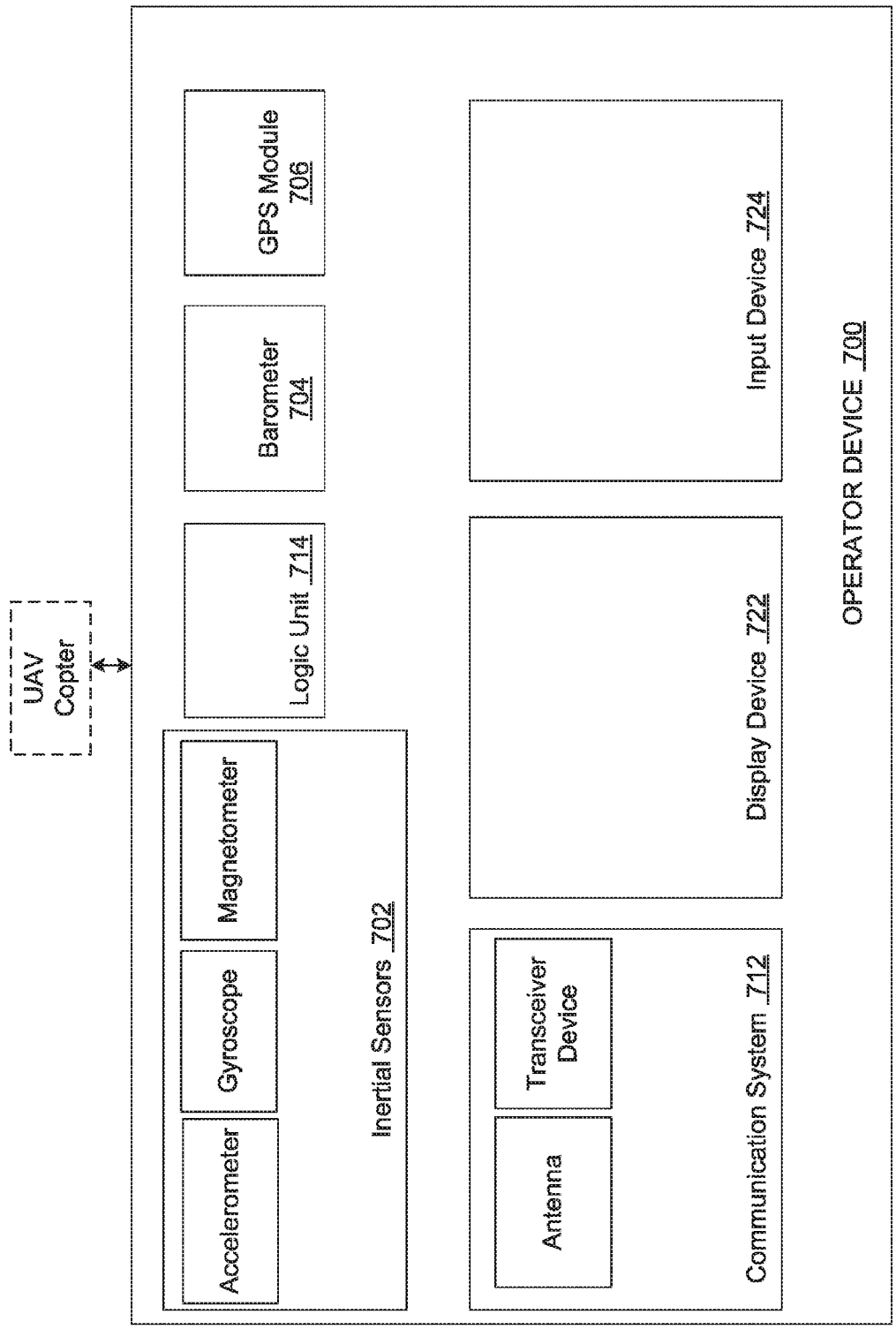
FIG. 7 is a block diagram of an operator device of a UAV copter, in accordance with various embodiments.

FIG. 7 is a block diagram of an operator device 700 of a UAV copter (e.g., the UAV copter 100 of FIG. 1 or the UAV copter 600 of FIG. 6), in accordance with various embodiments. The operator device 700 can be a wristband, an ankle band, a ring, a watch, a pendant, a belt, or any other type of wearable devices. The operator device 700 can be waterproof (e.g., by sealing the operator device 700 and/or processing electronic circuitry therein to prevent short circuiting from water). The operator device 700 can also be other types of mobile devices, such as a mobile phone, an e-reader, a personal digital assistant (PDA), and etc. The operator device 700 can serve at least one or both purposes of controlling the UAV copter and/or providing location information of a target subject for the UAV copter.

The operator device 700, for example, can include one or more inertial sensors 702. The inertial sensors 702, for example, can include at least one of accelerometers (e.g., 3-axis accelerometer), magnetometers (e.g., a 3-axis magnetometer), and gyroscopes (e.g., a 3-axis gyroscope). The operator device 700 can also include a barometer 704. The barometer 704 is used to measure ambient pressure, which is then used to approximate the elevation of the target subject, who is assumed to possess the operator device 700. The operator device 700 can further include a GPS module 706, which can determine the location of the operator device 700. The GPS module 706 can determine the longitude and latitude of the operator device 700 with accuracy when GPS signals are available. The GPS module 706 can also determine the elevation (e.g., z-axis coordinate) of the operator device 700. In some embodiment, the elevation reading of the GPS module 706 has at a lower resolution than the longitude and latitude reading.

The operator device 700 can include a communication module 712 (e.g., including an antenna and a transceiver device). The communication module 712 can wirelessly communicate with the UAV copter via one or more wireless communication protocols, such as WiFi Direct, WiFi, Bluetooth, or other long-range or short-range radio frequency (RF) communication. The operator device 700 can send the sensor readings from the inertial sensors 702, the barometer 704, or the GPS module 706 to the UAV copter.

In some embodiments, the operator device 700 includes a logic unit 714. The logic unit 714, for example, can be a processor, an application specific integrated circuit (ASIC), a field programmable gate array (FPGA), or other electronic circuitry for performing computations. The operator device 700 can include a memory module 316, such as non-transitory computer readable storage medium. The memory module 316 can store executable instructions to configure the logic unit 714 to implement the processes disclosed in this disclosure. For example, the logic unit 714 can process the sensor readings of the inertial sensors 702 to determine coordinates of the operator device 700. In some embodiments, once the coordinates are determined, the coordinates are sent to the UAV copter. In other embodiments, the raw sensor readings are sent to the UAV copter.

In some embodiments, the operator device 700 can include a display device 722 and input device 724. In some embodiments, the display device 722 and the input device 724 can be coupled together, such as a touchscreen display. The display device 722 and the input device 724 can be used to implement a user interface to control and monitor the UAV copter.

Figure 8:
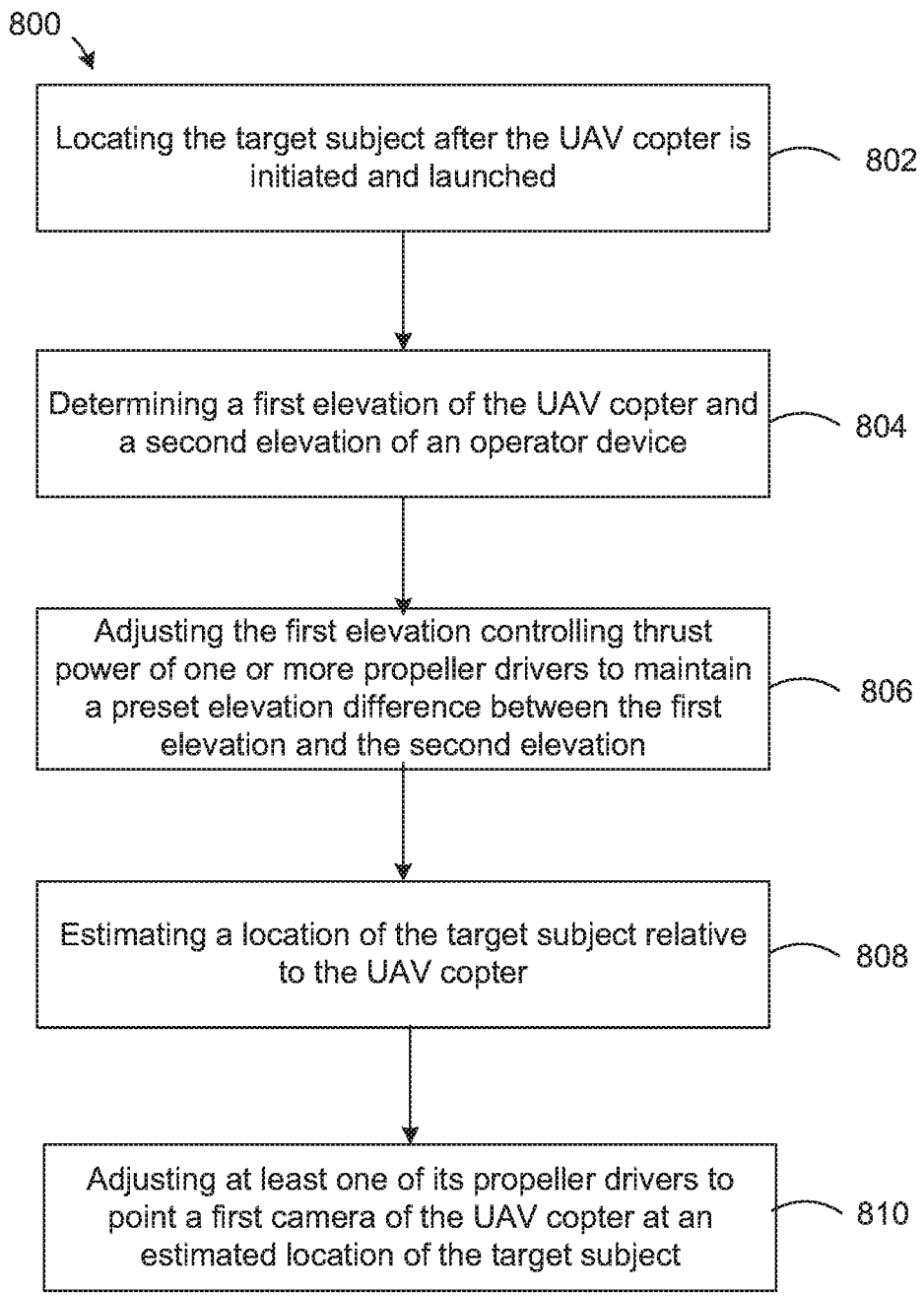
FIG. 8 is a flow chart of a method of operating a UAV copter to track a target subject, in accordance with various embodiment.

FIG. 8 is a flow chart of a method 800 of operating a UAV copter to track a target subject, in accordance with various embodiment. The UAV copter can be the UAV copter 100 of FIG. 1 or the UAV copter 600 of FIG. 6. The UAV copter is a vehicle carrying a camera. The target subject is a person or object that the UAV copter is configured to capture on camera. The method 800 begins with step 802 of the UAV copter locating the target subject after the UAV copter is initiated and launched.

Then, at step 804, the UAV copter determines a first elevation of the UAV copter and a second elevation of an operator device. The operator device is a device assumed to be possessed by the target subject. The UAV copter can be configured to associate with the operator device before initiating and launching the UAV copter. The UAV copter can determine the first elevation by calculating the first elevation based on a barometer reading, a GPS z-axis reading, an inertial sensor reading, or any combination thereof. The UAV copter can determine the second elevation (i.e., the elevation of the operator device) by receiving sensor reading (e.g., a barometer reading, a GPS z-axis reading, an inertial sensor reading, or any combination thereof) from the operator device, and calculating the second elevation based on the sensor reading. Alternatively, the UAV copter can receive the second elevation from the operator device (i.e., assuming the operator device can determine its own elevation, such as based on a barometer reading, an inertial sensor reading, a GPS z-axis reading, or any combination thereof, on the operator device). At step 806, the UAV copter adjusts its elevation (i.e., the first elevation) by controlling thrust power of one or more propeller drivers to maintain a preset elevation difference between itself and the operator device.

At step 808, the UAV copter estimates a location of the target subject relative to the UAV copter. For example, the UAV copter can determine a coordinate location (e.g., 3D coordinates) of the UAV copter based on a GPS module in the UAV copter. For another example, the UAV copter can determine a coordinate location of the UAV copter based on an inertial sensor reading from one or more inertial sensors in the UAV copter. The inertial sensors can include one or more of 3-axis accelerometers, 3-axis magnetometers, and 3-axis gyroscopes.

Estimating the location of the target subject relative to the UAV copter can also include determining a location of an operator device. For example, the location of the target subject can be estimated by receiving a coordinate location (e.g., 3D coordinates) of the operator device expected to be in possession of the target subject and associated with the UAV copter. In this example, the UAV copter expects that the operator device determines its own location. For instance, the operator device can determine its own location with an onboard GPS module or by calculating its location based on inertial sensor readings with onboard inertial sensors. For another example, the UAV copter can receive inertial sensor readings from an operator device expected to be in possession of the target subject, and then calculate the coordinate location of the operator device based on the inertial sensor readings.

Estimating the location of the target subject relative to the UAV copter can include locating the target subject utilizing a camera of the UAV copter. The camera can be the first camera or a second camera. For example, the first camera can be a sideway looking camera and the second camera can be a downward looking camera. The UAV copter can track the target subject in a camera frame of the second camera in the UAV copter. This can be accomplished by a person detection algorithm by analyzing the images from the camera (e.g., by classifying image segments using features, such as histogram of oriented gradients). In some embodiments, the UAV copter can determine a motion of the target subject to determine not only the location of the target subject relative to the UAV copter, but an expected location of the target subject within a predetermined interval of time.

Then, at step 810, the UAV copter adjusts at least one of its propeller drivers to point a first camera of the UAV copter at the estimated location of the target subject (e.g., at the location of the operator device). Prior to the adjustment step in step 810 and/or step 806, the UAV copter can determine that the UAV copter is operating in an autonomous mode or a semi-autonomous mode, where in either the autonomous mode or the semi-autonomous mode, no operator controls yaw or elevation of the UAV copter in real-time.

Figure 9:
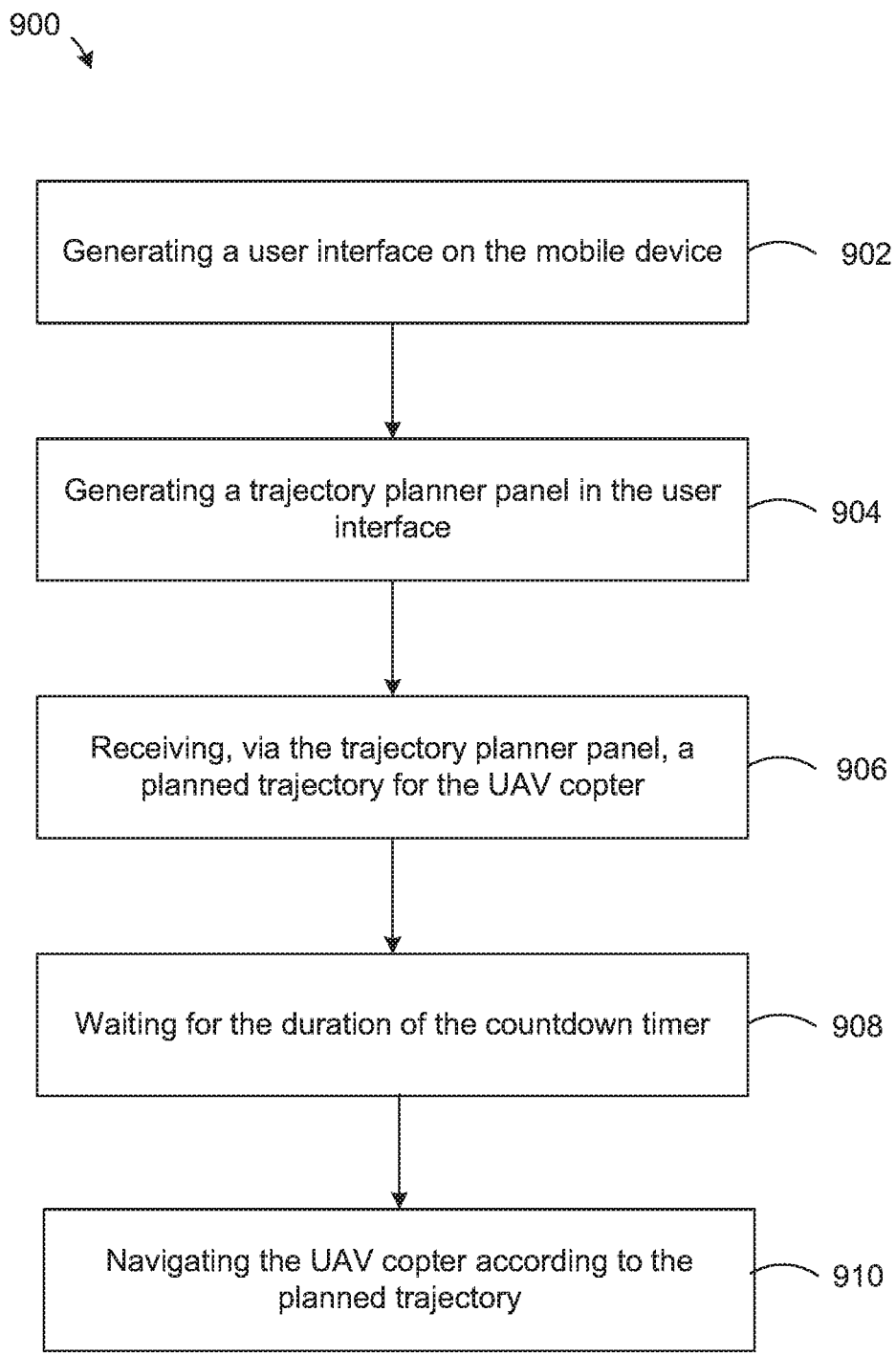
FIG. 9 is a flow chart of a method of operating a mobile device to control a UAV copter, in accordance with various embodiment.

FIG. 9 is a flow chart of a method 900 of operating a mobile device (e.g., the operator device 700 of FIG. 7) to control a UAV copter (e.g., the UAV copter 100 of FIG. 1 or the UAV copter 600 of FIG. 6), in accordance with various embodiment. At step 902, the mobile device generates a user interface on the mobile device. The user interface can be used to configure the UAV copter before launching the UAV copter. For example, the user interface enables an operator to select amongst an autonomous mode, a semi-autonomous mode, or manual mode of operating the UAV copter. The user interface also enables the operator to select a preset elevation difference between the target subject (e.g., the operator) and the UAV copter. In the semi-autonomous mode, the mobile device can generate a one-handed control panel in the user interface to control the pitch and roll of the UAV copter while allowing the UAV copter to control its own yaw and elevation in real-time. In the manual mode, the mobile device can generate a two-handed control panel in the user interface to control not only the pitch and roll of the UAV copter, but also the elevation and the yaw.

In the autonomous mode or the semi-autonomous mode, the mobile device can generate a trajectory planner panel in the user interface at step 904. The trajectory planner panel can include a map of a surrounding environment of the UAV copter. The map can be textured based on an image captured by a downward facing camera or a sideway facing camera of the UAV copter. At step 906, the mobile device can receive, via the trajectory planner panel, a planned trajectory for the UAV copter. For example, an operator can input the planned trajectory by dragging his/her finger on the map of the trajectory planner panel. At step 906, the operator can also set a countdown timer. Once the countdown timer is initiated, the UAV copter can wait for the duration of the countdown timer in step 908 and then navigate the UAV copter according to the planned trajectory at step 910.

While processes or blocks are presented in a given order in FIGS. 8-9, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 10:
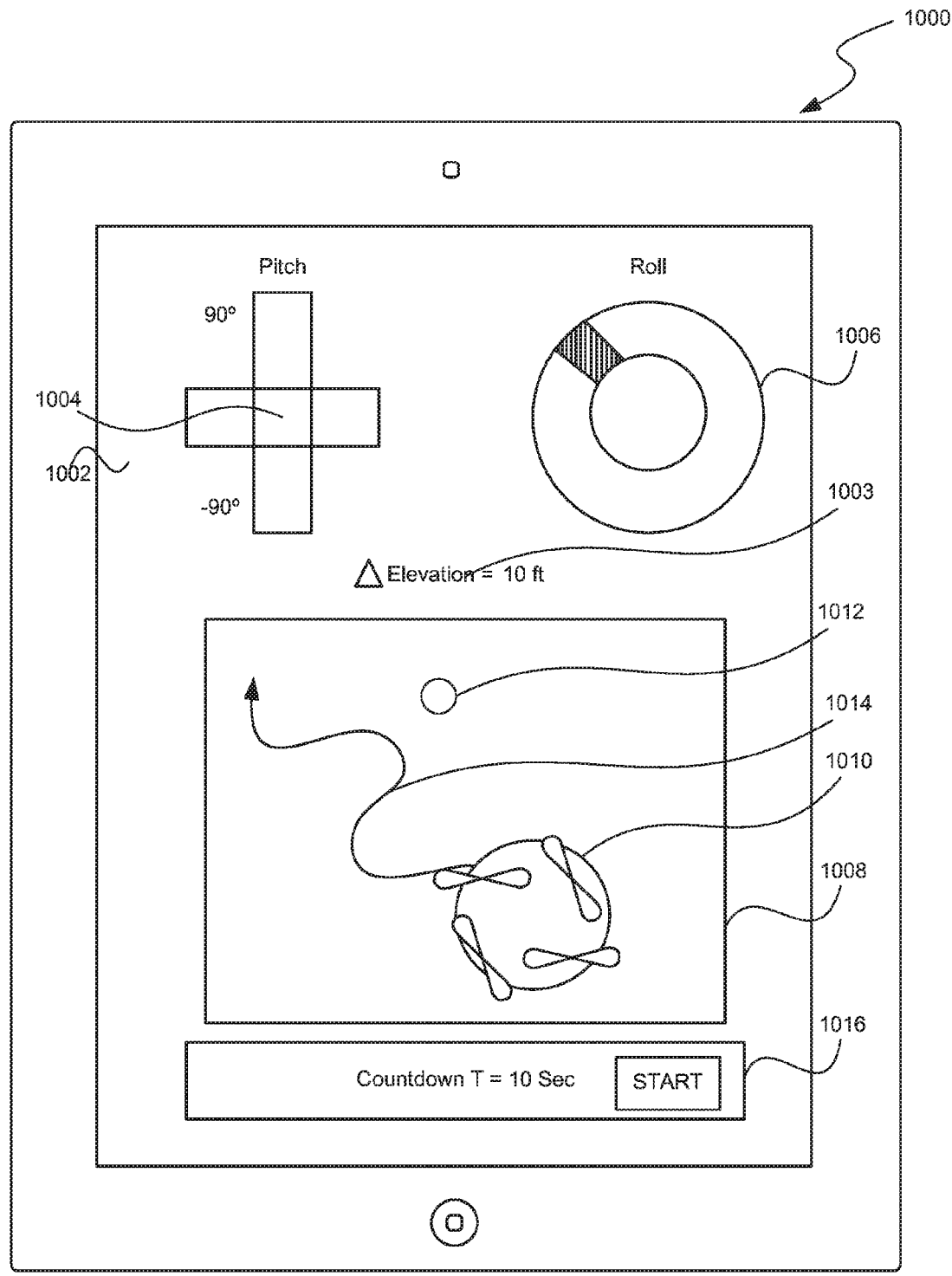
FIG. 10 is an example of a user interface implemented by a mobile device for controlling a UAV copter, in accordance with various embodiment.

FIG. 10 is an example of a user interface 1002 implemented by a mobile device 1000 for controlling a UAV copter (e.g., the UAV copter 100 of FIG. 1 or the UAV copter 600 of FIG. 6), in accordance with various embodiment. The user interface 1002 can be configured to be a one-handed interface or a two-handed interface. The user interface 1002 in FIG. 10 is shown as a one-handed interface. When configured as a one-handed interface, the controls for elevation and yaw adjustments are absent. The one-handed interface, however, enable a user to preset an elevation difference 1003 to maintain between the UAV copter and a target subject (e.g., represented by an operator device worn or possessed by the target subject).

For example, the user interface 1002 includes a pitch adjustment element 1004, where a user of the mobile device 1000 can adjust the pitch of the UAV copter remotely. The user interface 1002 also includes a roll adjustment element 1006, where a user of the mobile device 1000 can adjust the roll of the UAV copter remotely.

The user interface 1002 can also include a trajectory planner panel 1008. For example, the trajectory planner panel 1008 can display a location 1010 of the UAV copter on a map. In some embodiments, the map can be textured with a photograph or a composite image of photographs taken from a camera (e.g., a downward facing camera and/or a side-way facing camera). In some embodiments, the map can show a location 1012 of an operator device (e.g., estimated location of a target subject). In some embodiments, the map can show a trajectory 1014 drawn by the user (e.g., by dragging a finger across the trajectory planner panel 1008).

In some embodiments, the user interface 1002 can include a countdown timer 1016. The user can specify a time duration for the countdown. Once the user starts the countdown, the countdown timer 1016 counts down till the timer reaches zero, at which point the UAV copter will be instructed to begin following the trajectory drawn by the user.

Mechanism for Launching an UAV in Mid-Air

Figure 11:
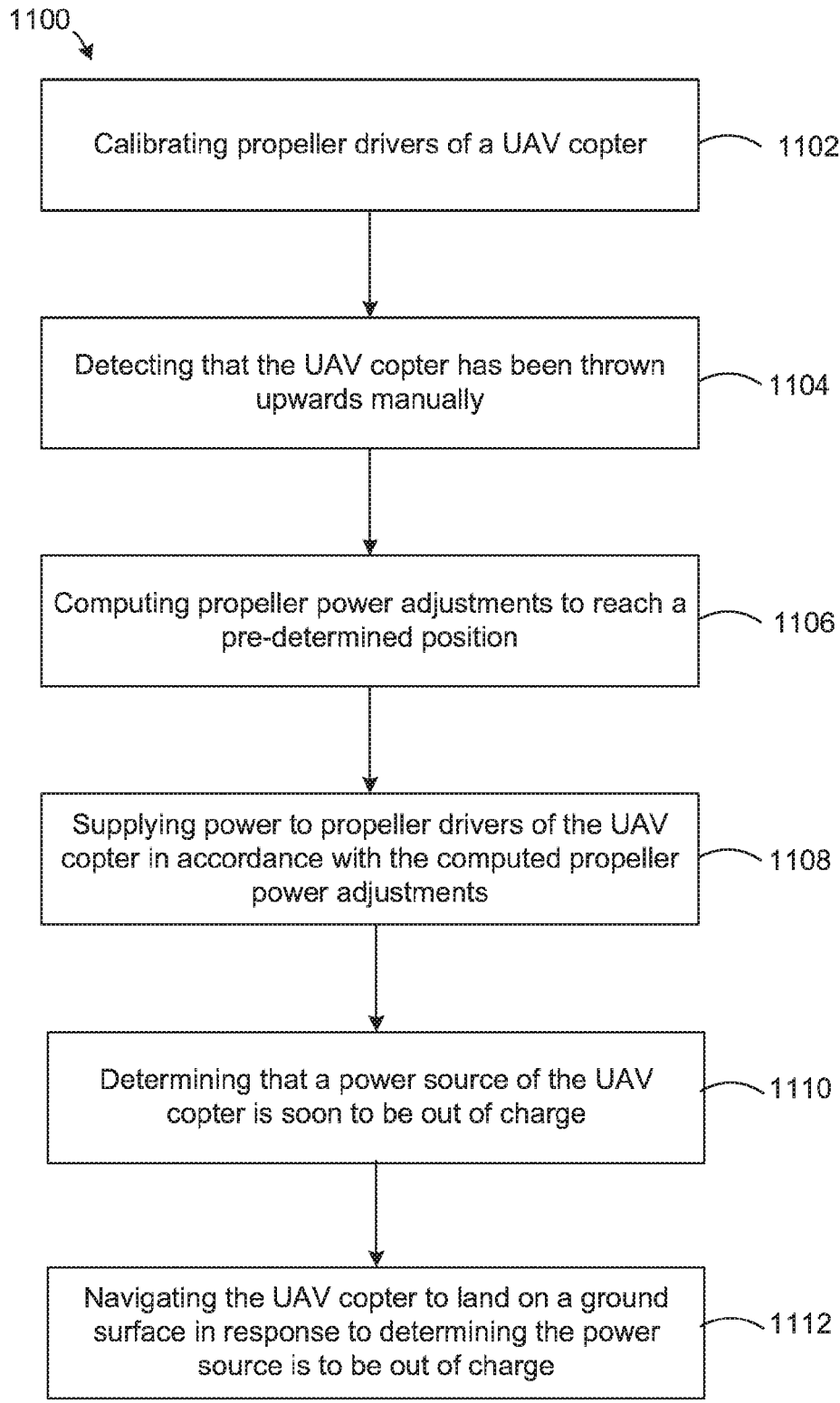
FIG. 11 is a flow chart of a method of operating a UAV copter to launch in mid-air, in accordance with various embodiment.

FIG. 11 is a flow chart of a method 1100 of operating a UAV copter to launch in mid-air, in accordance with various embodiment. For example, the UAV copter can be the UAV copter 100 of FIG. 1 or the UAV copter 600 of FIG. 6. The method 1100 can be performed by the control system 604 of FIG. 6. The method 1100 can begin with step 1102 of calibrating the propeller drivers of a UAV copter. In some embodiments, the UAV copter can be calibrated on an even ground surface. In other embodiments, the UAV copter can be calibrated in mid-air. In some embodiments, step 1102 can be skipped when the UAV copter has previously been calibrated before, and the control system (e.g., the control system 604) of the UAV copter has had uninterrupted power since the previous calibration.

At step 1104, the UAV copter can detect that the UAV copter has been thrown upwards manually (e.g., before reaching free fall). When the UAV copter is on, it can detect that it has been thrown by analyzing sensor readings from its sensors.

In some embodiments, the UAV copter can detect it has been thrown based on sensor readings of its inertial sensors (e.g., the inertial sensors 626 of FIG. 6). The UAV copter can determine a downward acceleration or an upwards acceleration based on its inertial sensor readings, such as accelerometer readings. The UAV copter can turn on its propellers based on the acceleration readings. For example, a predetermined level of acceleration (e.g., a certain magnitude of upward or downward acceleration) can trigger the UAV copter to turn on its propellers. For another example, a predetermined change in level of acceleration can trigger the UAV copter to turn on its propellers, such as when an upwards acceleration changes to a downward acceleration. In other embodiments, the UAV copter can turn on its propellers based on velocity readings. For example, the UAV copter can turn its propellers when a predetermined velocity (e.g., a preset upward velocity or downward velocity) is reached.

In some embodiments, the UAV copter can detect it has been thrown by detecting its change in elevation. For example, the UAV copter can detect its change in elevation based on a GPS module (e.g., the GPS module 628 of FIG. 6) readings. The GPS module can provide z-axis coordinate of the UAV copter. For another example, the UAV copter can detect its change in elevation based on a barometer reading (e.g., the barometer 630 of FIG. 6). The UAV copter can detect the change in ambient pressure and use that to approximate the change in elevation.

In some embodiments, the UAV copter can detect it has been thrown by detecting motion via its one or more cameras (e.g., the cameras 642 of FIG. 6). For example, an image processing module of the UAV copter can detect motion from the video feeds of the cameras by comparing consecutive frames. For another example, the UAV copter can use an autofocusing mechanism of the cameras to detect motion.

In response to detecting that the UAV copter has been thrown, the UAV copter can compute propeller power adjustments to reach a pre-determined position in step 1106. For example, the predetermined position is a predetermined elevation level relative to an operator device (e.g., a device worn by or possessed the operator of the UAV copter). In step 1108, the UAV copter can supply power to propeller drivers (e.g., the propeller drivers 652 of FIG. 6) of the UAV copter in accordance with the computed propeller power adjustments.

In step 1110, the UAV copter can determine that a power source of the UAV copter is soon to be out of charge (e.g., a predetermined percentage of charge, such as 1-5%, or a predetermined time interval, such as 1 to 3 minutes). In response to step 1110, the UAV copter can navigate to land in step 1112. For example, the UAV copter can determine its three-dimensional (3D) coordinate, detect a ground surface proximate to the UAV copter and navigate to land on the ground surface based on the determined 3D coordinate.

Figure 12A:
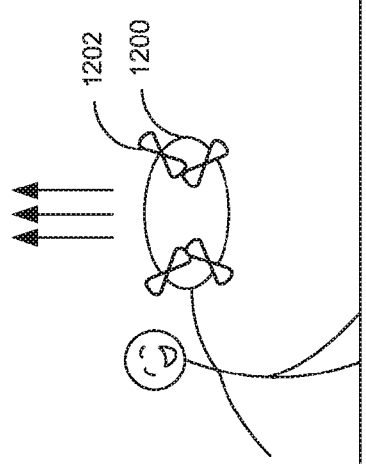
Figure 12B:
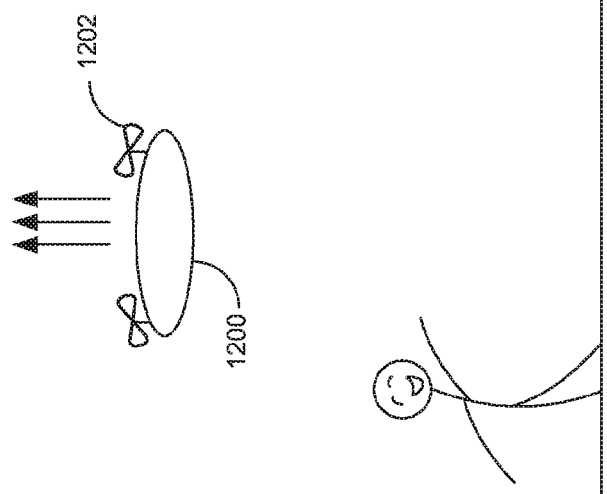
Figure 12D:
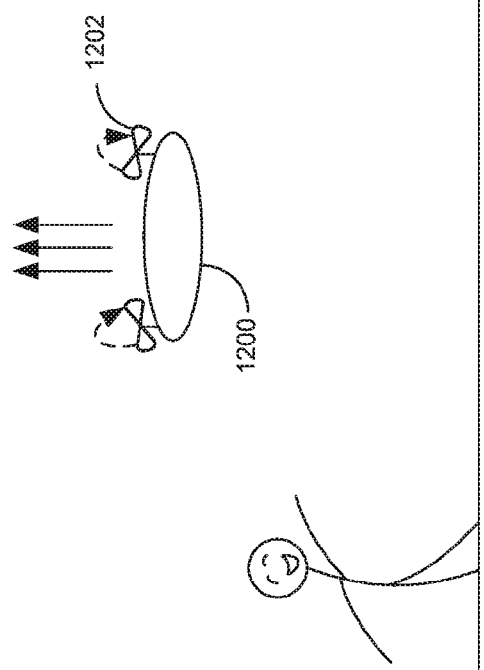

FIGS. 12A-12D are illustrations of a UAV copter 1200 launching in mid-air, in accordance with various embodiment. FIG. 12A illustrates an operator holding the UAV copter 1200 in his hand. As illustrated, propellers 1202 of the UAV copter 1200 remain inert even though the UAV copter 1200 is turned on. FIG. 12B illustrates the UAV copter 1200 being thrown in air. As illustrated, the UAV copter 1200 has a velocity vector going upwards, but the propellers 1202 still remain inert. FIG. 12C illustrates the UAV copter 1200 starting to fall. As illustrated, the UAV copter 1200 has detected that it is thrown into the air, such as in accordance with the method 1100 of FIG. 11, and has turned on the propellers 1202. FIG. 12D illustrates the UAV copter 1200 starting to rise after the propellers 1202 have provided enough thrust to counteract the g-force.

Figure 13:
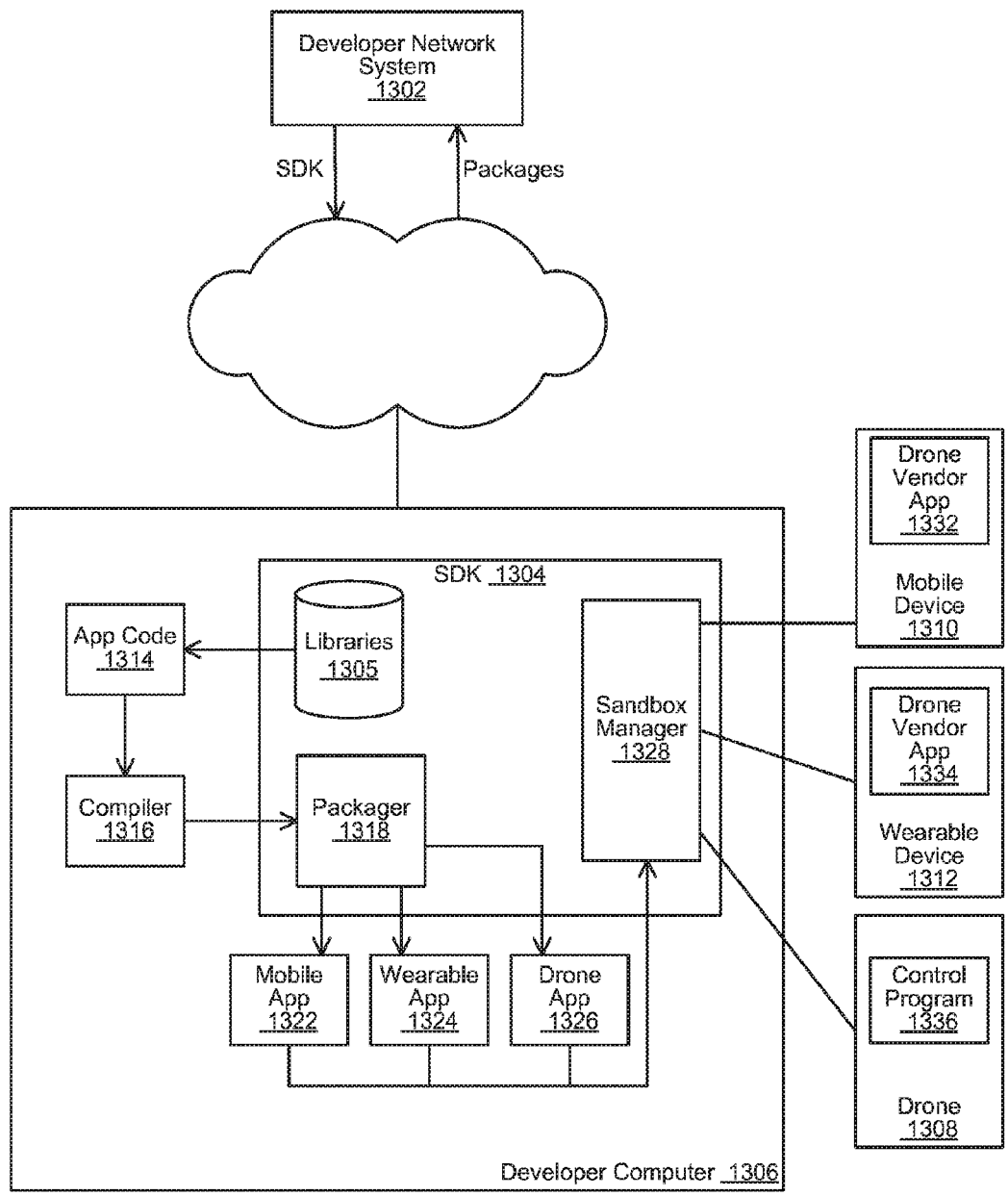
FIG. 13 is a block diagram of a system environment for a developer to generate third-party control applications for an autonomous drone, in accordance with various embodiments.

Developer Toolkit to Provide Third-Party Control Applications to an Autonomous Drone FIG. 13 is a block diagram of a system environment for a developer to generate third-party control applications for an autonomous drone (e.g., an unmanned aerial vehicle, an unmanned surface vehicle, unmanned water vehicle, or any combination thereof), in accordance with various embodiments. In various embodiments, the autonomous drone can be a consumer videography drone with a camera mounted thereon. The third-party control application can provide third-party navigational algorithms, tracking algorithms, computer vision algorithm, navigational effects, image, audio, or video processing effects, sensor control algorithms, environmental/user context detection algorithms, facial or human profile detection/recognition algorithm, user interfaces, other output component control (e.g., a speaker or display) for the autonomous drone or a device that controls the autonomous drone. Such control device, for example, can include a mobile device and/or a wearable device.

The system environment includes a developer network system 1302. The developer network system 1302 can be implemented by one or more computing devices, such as computer servers. For example, the developer network system 1302 can provide a user interface for developers to download a software development kit (SDK) 1304 onto a developer computer 1306. In some embodiments, the developer network system 1302 enables developers of control applications for autonomous drones to share code packages with each other. In some embodiments, the developer network system 1302 can maintain version control of a control application for an autonomous drone using a cloud storage provided through the developer network system 1302.

In some embodiments, the developer network system 1302 generates a user interface for developers to download code libraries 1305 that exposes component functionalities of the autonomous drone or higher-level functionalities to control the autonomous drone. In some embodiments, to download one or more of the code libraries 1305 may require a payment from the developer or other agreements with the provider of the developer network system 1302.

For example, the code libraries 1305 can include executable instructions to implement data processing modules essential to operate the autonomous drone, and executable instructions for the third-party control application to access the functionalities of the data processing modules. These modules can be useful to provide post processing of sensor data captured by the autonomous drone or a device controlling the autonomous drone. For example, the code libraries 1305 can include a facial recognition library, a speaker recognition library, a human profile detection library, a 2D to 3D video conversion library, a slow-motion effect library, or any combination thereof.

For another example, the code libraries 1305 can include executable instructions to implement control algorithms to drive the autonomous drone. These modules can be useful to execute preset navigational behaviors. For example, the code libraries can include an aerial motion library, a user tracking library, a launch sequence library, or any combination thereof.

These code libraries 1305 may be downloaded separately from or as part of the SDK 1304. The code libraries 1305 can include other code libraries including at least drone-specific inter-device communication protocols, drone-specific navigational control interfaces, drone-specific maintenance protocols, drone-specific component control interfaces, or any combination thereof.

The developer computer 1306 can be used to test the third-party drone control application. The SDK 1304 enables a developer to use the developer computer 1306 to compile various types of the drone control applications. For example, the SDK 1304 can enable development of a drone control application for an autonomous drone 1308, a drone control application for a mobile device 1310 that controls the autonomous drone 1308, a drone control application for a wearable device 1312 that also facilitates the control of the autonomous drone 1308, or any combination thereof.

A developer can draft a third-party application by inputting application code 1314 (i.e., compilable or readily executable instructions) in the developer computer 1306. The application code 1314 can reference the code libraries 1305. In the case that application code 1314 contains compilable instructions, a compiler 1316 can compile the application code 1314 into the third-party application for the autonomous drone 1308 (e.g., for direct use on the autonomous drone 1308 or on a device that controls the autonomous drone 1308).

In some embodiments, the developer uses a packager component 1318 of the SDK 1304 to process the compiled application into an application package that may be uploaded to the autonomous drone 1308, the mobile device 1310, or the wearable device 1312. For example, the packager component 1318 can process the compiled application into a third-party mobile application 1322, a third-party wearable device application 1324, a third-party drone application 1326, or any combination thereof. In some embodiments, the compiler 1316 is part of the packager component 1318. In some embodiments, a sandbox manager 1328 can directly upload a compiled application to the autonomous drone 1308, the mobile device 1310, or the wearable device 1312. In other embodiments, the sandbox manager 1328 authenticates an application package first, and then upon authentication, uploads the application package to the autonomous drone 1308, the mobile device 1310, or the wearable device 1312. For example, the sandbox manager 1328 can authenticate a key embedded in the application package by the packager component 1318. In some embodiments, the sandbox manager 1328 is configured with a communication protocol (e.g., proprietary or standardized) to communicate with the autonomous drone 1308, the mobile device 1310, the wearable device 1312, or any combination thereof.

The third-party mobile application 1322 is a program configured to run on the mobile device 1310 that is not programmed by either the manufacturer of the mobile device 1310 or the manufacturer of the autonomous drone 1308 (i.e., "third-party" to both the mobile device 1310 and the autonomous drone 1308). In some embodiments, the third-party mobile application 1322 includes executable code to be implemented on a general-purpose mobile device, such as the mobile device 1310. A mobile device is considered "general-purpose" when it implements an operating system that can import one or more "third-party" applications (i.e., not designed by the maker of the operating system or the mobile device 1310) and execute the third-party applications on the operating system. In some embodiments, the mobile device 1310 has already installed a drone vendor application 1332, which is also "third-party" to the operating system and the mobile device 1310. The autonomous drone 1308 may require the drone vendor application 1332 to be installed on the mobile device 1310 in order for the mobile device 1310 to control the autonomous drone 1308. The third-party mobile application 1322 can be an application component that runs within the drone vendor application 1332. In some embodiments, the third-party mobile application 1322 can be a replacement of the drone vendor application 1332. In some embodiments, the third-party mobile application 1322 can run concurrently and cooperatively with the drone vendor application 1332 on the mobile device 1310. The packager component 1318 or the code libraries 1305 can embed executable instructions to authenticate the third-party mobile application 1322 as a vendor verified application such that the autonomous drone 1308 would enable communication with the third-party mobile application 1322.

Examples of the third-party mobile application 1322 may include a user interface skin to the control interface provided by the drone vendor application 1332. Other examples can include post-processing functionalities to process the video/image data captured by a camera of the autonomous drone 1308. For example, a slow motion effect post-processing may be performed on the captured video in response to detecting a contextual condition (e.g., a user has just jumped or accelerated). Such post-processing techniques can be executed synchronous to the capturing of the image or video or asynchronously from the capturing. In some embodiments, the third-party mobile application 1322 can be coupled to a third-party cloud-based service that stores and/or processes images and/or video uploaded from the autonomous drone 1308.

Likewise, the third-party wearable device application 1324 is a program configured to run on the wearable device 1312. The third-party wearable device application 1324 is not programmed by either the manufacturer of the wearable device 1312 or the manufacturer of the autonomous drone 1308. In some embodiments, the wearable device 1312 can be an application-specific device manufactured and/or designed by the designers of the autonomous drone 1308. In other embodiments, the wearable device 1312 can be a general purpose device similar to the mobile device 1310, such as a smart watch. The wearable device 1312 may have already installed a drone vendor application 1334 similar to the mobile device 1310.

The autonomous drone 1308 may require the drone vendor application 1334 to be installed on the wearable device in order for the wearable device 1312 to communicate with mobile device 1310 and/or the autonomous drone 1308. The third-party wearable device application 1324 can be an application component that runs within the drone vendor application 1334. In some embodiments, the third-party wearable device application 1324 can be a replacement of the drone vendor application 1334. In some embodiments, the third-party wearable device application 1324 can run concurrently and cooperatively with the drone vendor application 1334 on the mobile device 1310. The packager component 1318 or the code libraries 1305 can embed executable instructions to authenticate the third-party wearable device application 1324 as a vendor verified application such that the autonomous drone 1308 and/or the mobile device 1310 would enable communication with the third-party wearable device application 1324.

Examples of the third-party wearable device application 1324 may include power saving functionalities and contextual condition detection algorithms. For example, the third-party wearable device application 1324 can implement higher level functions based on component-level functionalities of the wearable device 1312's components (e.g., sensors and display/audio components). A contextual condition detection algorithm can read the inertial sensor data from the wearable device 1312 to detect specific user gesture (e.g., user is waving), user behavior (e.g., user is jumping at a specific angle), or environmental condition (e.g., user is at a specific altitude or temperature). These contextual conditions can be coupled to the behavior of the autonomous drone 1308, such as to execute sophisticated and choreographed flight plans for the autonomous drone 1308.

The third-party drone application 1326 is a program configured to run on the autonomous drone 1308. The third-party drone application 1326 is not programmed by the manufacturer of the autonomous drone 1308. The autonomous drone 1308 may have already installed a control program 1336 (i.e., a vendor-configured program) to operate the components (e.g., power components, motor components, sensor components, or any combination thereof) in the autonomous drone 1308. The control program 1336 enables the autonomous drone 1308 to navigate and to communicate with an operator device, such as the mobile device 1310 and/or the wearable device 1312. In some embodiments, the third-party drone application 1326 can be an application component that runs within the control program 1336. In some embodiments, the third-party drone application 1326 can provide updates to the control program 1336. In some embodiments, the third-party drone application 1326 can run concurrently and cooperatively with the control program 1336 to operate the autonomous drone 1308. The packager component 1318 or the code libraries 1305 can embed executable instructions to authenticate the third-party drone application 1326 as a vendor verified application. Once verified, the control program 1336 can then execute the third-party drone application 1326. In some embodiments, the control program 1336 can be implemented via hardware instead of software, such as via an application-specific integrated circuit or a field programmable gate array.

Examples of the third-party drone application 1326 may include power saving functionalities, tracking functionalities, navigational behaviors, flight plan templates, contextual condition detection algorithms, context-based flight plans, or any combination thereof. For example, the third-party wearable device application 1324 can implement higher level functions based on component-level functionalities of the autonomous drone 1308's components (e.g., sensors, motors, control circuitry, camera(s), etc.). A contextual condition detection algorithm can read the sensor data from the wearable device 1312 to detect specific drone behavior (e.g., the autonomous drone 1308 is falling or running out of battery) or environmental condition (e.g., user is at a specific altitude or temperature). These contextual conditions can be coupled to the behavior of the autonomous drone 1308 via the context-based flight plans, such as to execute sophisticated and choreographed flight plans for the autonomous drone 1308.

Figure 14:
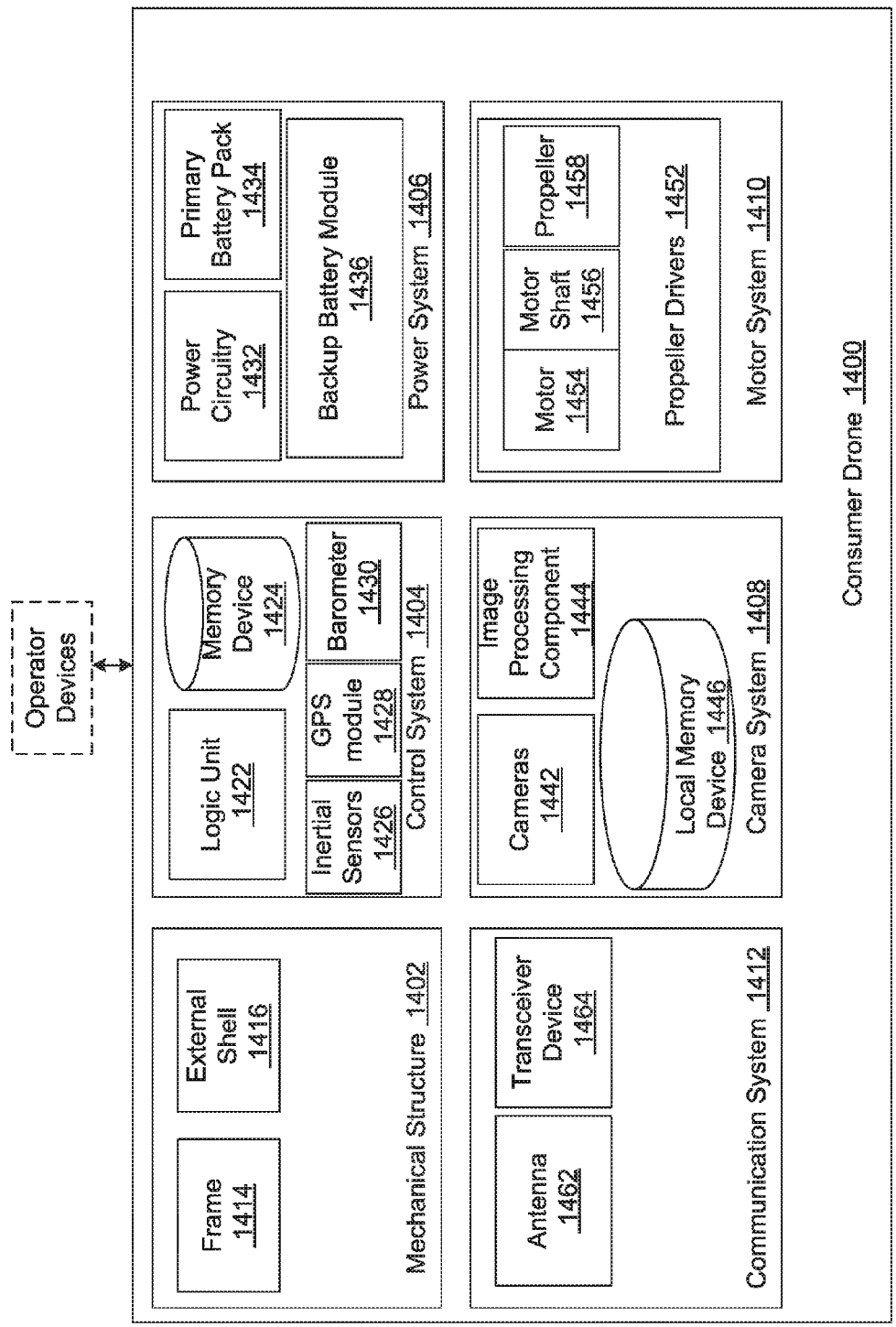
FIG. 14 is a block diagram of a consumer drone, in accordance with various embodiments.

FIG. 14 is a block diagram of a consumer drone 1400 (e.g., the autonomous drone 1308 of FIG. 13), in accordance with various embodiments. The consumer drone 1400 includes a mechanical structure 1402, a control system 1404, a power system 1406, a camera system 1408, a motor system 1410, and a communication system 1412. The consumer drone 1400 can be controlled by one or more operator devices (shown as dashed boxes). For example, the operator devices can be the operator device 1500 of FIG. 15. The operator devices can include, for example, a remote control, a mobile device, a wearable device, and etc. In some embodiments, one operator device (e.g., a wearable device) is for tracking the location of the operation, and another operator device (e.g., a mobile phone with a touchscreen) is for controlling the consumer drone 1400. The operator device for controlling the consumer drone 1400 can also be used to supplement the location tracking of the operator.

The mechanical structure 1402 includes a frame 1414 and an external shell 1416. The external shell 1416 can include a bottom cover. The external shell 1416 surrounds and protects the consumer drone 1400. In various embodiment, the external shell 1416 is hermetically sealed to waterproof the consumer drone 1400, including sealing the control system 1404, and thus prevent liquid (e.g., water) or snow from entering the power system 1406 and the communication system 1412, when the consumer drone 1400 is completely or partially immersed in liquid or snow. While a camera lens of the camera system 1408 can be exposed on the external shell 1416, the rest of the camera system 1408 can also be hermetically sealed within the external shell 1416. In some embodiments, only the motor system 1410 of the consumer drone 1400 is exposed outside of the external shell 1416. The motor system 1410 can be processed to be waterproof as well, without being sealed within the external shell 1416. The above hermetical sealing of component systems of the consumer drone 1400 and processing of the motor system 1410 advantageously provide a waterproof consumer drone to photo-shoot and take video for athletes participating in adventure sports, such as surfing, sail boating, or snowboarding.

The control system 1404 can be implemented as electronic components and/or circuitry including a logic unit 1422, such as a processor, an application specific integrated circuit (ASIC), a field programmable gate array (FPGA), or any combination thereof. The control system 1404 can also include a memory device 1424, such as a non-transitory computer readable storage medium. The memory device 1424 can store executable instructions for controlling the consumer drone 1400. The executable instructions can be executed by the logic unit 1422. The control system 1404 can receive instructions remotely from or send information to an operator device via the communication system 1412.

The control system 1404 can include one or more sensors, such as inertial sensors 1426, a GPS module 1428, and a barometer 1430. The inertial sensors 1426 provide navigational information, e.g., via dead reckoning, including at least one of the position, orientation, and velocity (e.g., direction and speed of movement) of the consumer drone 1400. The inertial sensors 1426 can include one or more accelerometers (providing motion sensing readings), one or more gyroscopes (providing rotation sensing readings), one or more magnetometers (providing direction sensing), or any combination thereof. The inertial sensors 1426 can provide up to three dimensions of readings, such as via 3-axis accelerometer, 3-axis gyroscope, and 3-axis magnetometer. The GPS module 1428 can provide three-dimensional coordinate information of the consumer drone 1400 via communication with one or more GPS towers, satellites, or stations. The barometer 1430 can provide ambient pressure readings used to approximate elevation level (e.g., absolute elevation level) of the consumer drone 1400.

The power system 1406 includes at least a power circuitry 1432, a primary battery pack 1434, and a backup battery module 1436. When the consumer drone 1400 is powered on, the primary battery pack 1434 supplies power to the control system 1404, the camera system 1408, the motor system 1410, and the communication system 1412, whenever power is needed. The primary battery pack 1434 also supplies power to recharge the backup battery module 1436. In some embodiments, the backup battery module 1436 is embedded within the consumer drone 1400 and is not removable or replaceable.

The power circuitry 1432 can be configured to regulate the power drawn from the primary battery pack 1434. The power circuitry 1432 can be configured to monitor the charge level of the primary battery pack 1434. The power circuitry 1432 can further be configured to detect potential fault and estimate a lifespan of the primary battery pack 1434 and/or the backup battery module 1436. The power circuitry 1432 can be configured to detect a disruption of power from the primary battery pack 1434 (e.g., when the primary battery pack 1434 is removed from the consumer drone 1400 or when the primary battery pack 1434 is out of charge). The power circuitry 1432 can be configured to detect opening of a battery compartment in the mechanical structure 1402. The power circuitry 1432 can route power from the backup battery module 1436 to the control system 1404 upon detecting the disruption of power or the opening of the battery compartment. The backup battery module 1436 is able to maintain sufficient charge to power the control system 1404 for a short duration, such as 60 seconds. In embodiments, the backup battery module 1436 is only used to power the control system 1404 in absence of the primary battery pack 1434, but not to power other systems in the consumer drone 1400.

The camera system 1408 includes one or more cameras 1442 and an image processing component 1444. The camera system 1408 can include a local memory device 1446 to store multimedia observations made by the cameras 1442, including photos, audio clips (e.g., from cameras with microphones), and/or videos. The camera system 1408 can also have access to the memory device 1424. In some embodiments, the local memory device 1446 is the memory device 1424. The image processing component 1444 can be implemented in the form of a processor, an ASIC, a FPGA, or other logical circuitry. The image processing component 1444 can be implemented by the logic unit 1422 in the control system 1404. For example, the image processing component 1444 can be implemented as a set of executable instructions stored in the memory device 1424. Each of the cameras 1442 may include sub-components other than image capturing sensors, including auto-focusing circuitry, ISO adjustment circuitry, and shutter speed adjustment circuitry, etc.

The image processing component 1444 can be configured to detect obstacles within the consumer drone 1400's trajectory. The image processing component 1444 can also be configured to detect a target subject, such as the owner of the consumer drone 1400. In some embodiments, the image processing component 1444 can track multiple target subjects. The image processing component 1444 can perform other tasks, such as image filtering, image calling, video frame sampling, and other image processing, audio processing, and/or video processing techniques. The image processing component 1444 can also predict the trajectory of the obstacles or the target subject. In some embodiments, an operator device that is expected to be possessed by the target subject can emit certain light or visual signals to render the target subject detectable by the camera system 1408 to help locate the target subject.

The motor system 1410 includes one or more propeller drivers 1452. Each of the propeller drivers 1452 includes a motor 1454, a motor shaft 1456, and a propeller 1458. The propeller drivers 1452 can be controlled by the control system 1404 and powered by the power system 1406.

The communication system 1412 includes an antenna 1462 and a transceiver device 1464. The transceiver device 1464 can include any of modulators, de-modulators, encoders, decoders, encryption modules, decryption modules, amplifiers, and filters. The communication system 1412 can receive control instructions (e.g., navigational mode toggling, trajectory instructions, general settings, etc.) from one of the operator devices. The communication system 1412 can send reporting of status of the consumer drone 1400 to one of the operator devices. The communication system 1412 further enables the camera system 1408 to send the multimedia content it captures to one of the operator devices.

The active components described for the autonomous drone 1308, the consumer drone 1400, and the operator device 1500 may operate individually and independently of other active components. Some or all of the active components can be controlled, partially or in whole, remotely or via an intelligence system in the autonomous drone 1308, the consumer drone 1400, and/or the operator device 1500. The separate active components can be coupled together through one or more communication channels (e.g., wireless or wired channel) to coordinate their operations. Some or all of the components may be combined as one component or device. A single component may be divided into sub-components, each sub-component performing separate functional part or method step(s) of the single component. The autonomous drone 1308, the consumer drone 1400, and/or the operator device 1500 may include additional, fewer, or different components for various applications.

Figure 15:
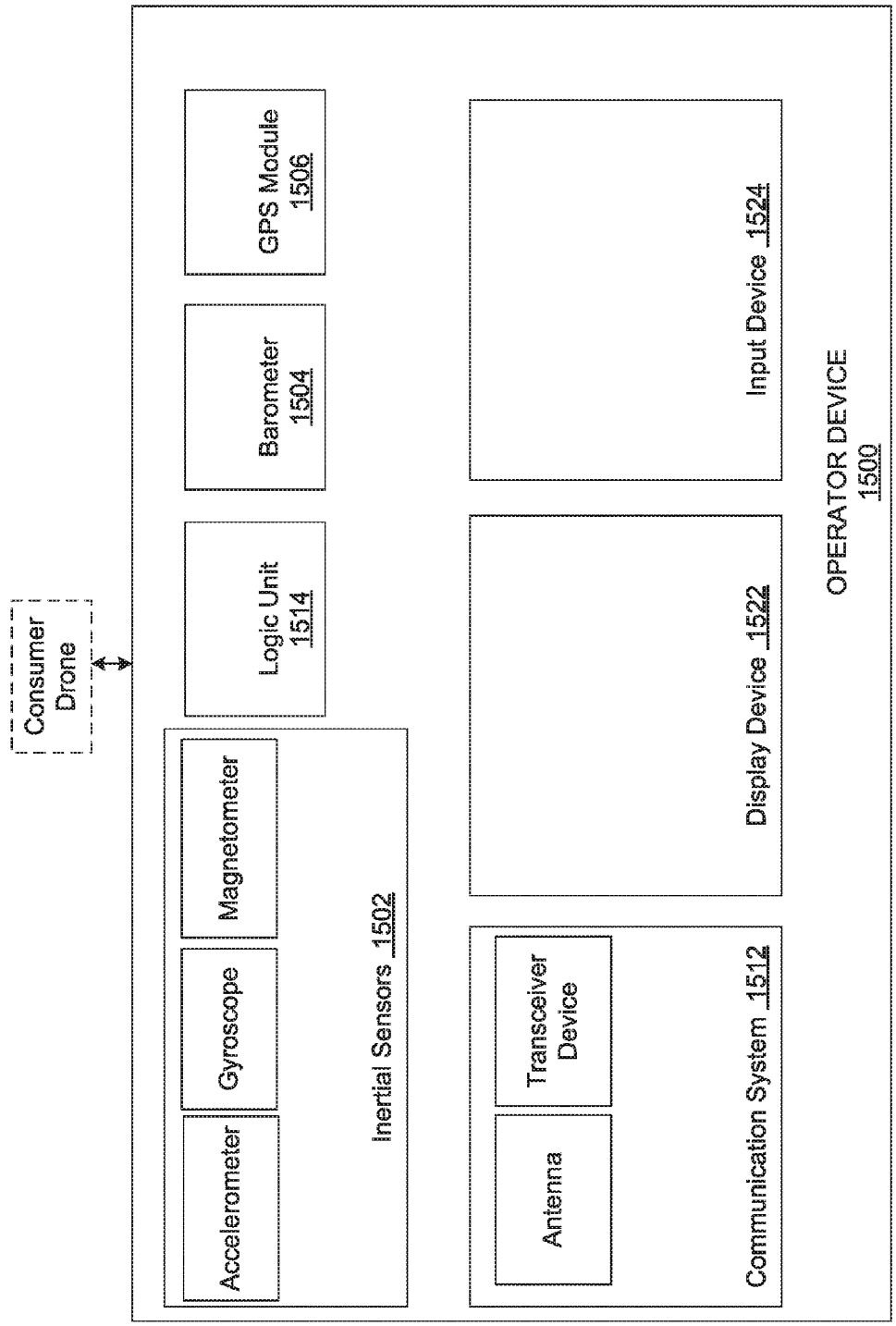
FIG. 15 is a block diagram of an operator device of a consumer drone, in accordance with various embodiments.

FIG. 15 is a block diagram of an operator device 1500 of a consumer drone (e.g., the autonomous drone 1308 of FIG. 13 or the consumer drone 1400 of FIG. 14), in accordance with various embodiments. The operator device 1500 can be the wearable device 1312 or the mobile device 1310 of FIG. 13. The operator device 1500 can be a wristband, an ankle band, a ring, a watch, a pendant, a belt, or any other type of wearable devices. The operator device 1500 can be waterproof (e.g., by sealing the operator device 1500 and/or processing electronic circuitry therein to prevent short circuiting from water). The operator device 1500 can also be other types of mobile devices, such as a mobile phone, an e-reader, a personal digital assistant (PDA), and etc. The operator device 1500 can serve at least one or both purposes of controlling the consumer drone and/or providing location information of a target subject for the consumer drone.

The operator device 1500, for example, can include one or more inertial sensors 1502. The inertial sensors 1502, for example, can include at least one of accelerometers (e.g., 3-axis accelerometer), magnetometers (e.g., a 3-axis magnetometer), and gyroscopes (e.g., a 3-axis gyroscope). The operator device 1500 can also include a barometer 1504. The barometer 1504 is used to measure ambient pressure, which is then used to approximate the elevation of the target subject, who is assumed to possess the operator device 1500. The operator device 1500 can further include a GPS module 1506, which can determine the location of the operator device 1500. The GPS module 1506 can determine the longitude and latitude of the operator device 1500 with accuracy when GPS signals are available. The GPS module 1506 can also determine the elevation (e.g., z-axis coordinate) of the operator device 1500. In some embodiment, the elevation reading of the GPS module 1506 has at a lower resolution than the longitude and latitude reading.

The operator device 1500 can include a communication module 1512 (e.g., including an antenna and a transceiver device). The communication module 1512 can wirelessly communicate with the consumer drone via one or more wireless communication protocols, such as WiFi Direct, WiFi, Bluetooth, or other long-range or short-range radio frequency (RF) communication. The operator device 1500 can send the sensor readings from the inertial sensors 1502, the barometer 1504, or the GPS module 1506 to the consumer drone.

In some embodiments, the operator device 1500 includes a logic unit 1514. The logic unit 1514, for example, can be a processor, an application specific integrated circuit (ASIC), a field programmable gate array (FPGA), or other electronic circuitry for performing computations. The operator device 1500 can include a memory module 316, such as non-transitory computer readable storage medium. The memory module 316 can store executable instructions to configure the logic unit 1514 to implement the processes disclosed in this disclosure. For example, the logic unit 1514 can process the sensor readings of the inertial sensors 1502 to determine coordinates of the operator device 1500. In some embodiments, once the coordinates are determined, the coordinates are sent to the consumer drone. In other embodiments, the raw sensor readings are sent to the consumer drone.

In some embodiments, the operator device 1500 can include a display device 1522 and input device 1524. In some embodiments, the display device 1522 and the input device 1524 can be coupled together, such as a touchscreen display. The display device 1522 and the input device 1524 can be used to implement a user interface to control and monitor the consumer drone.

Figure 16:
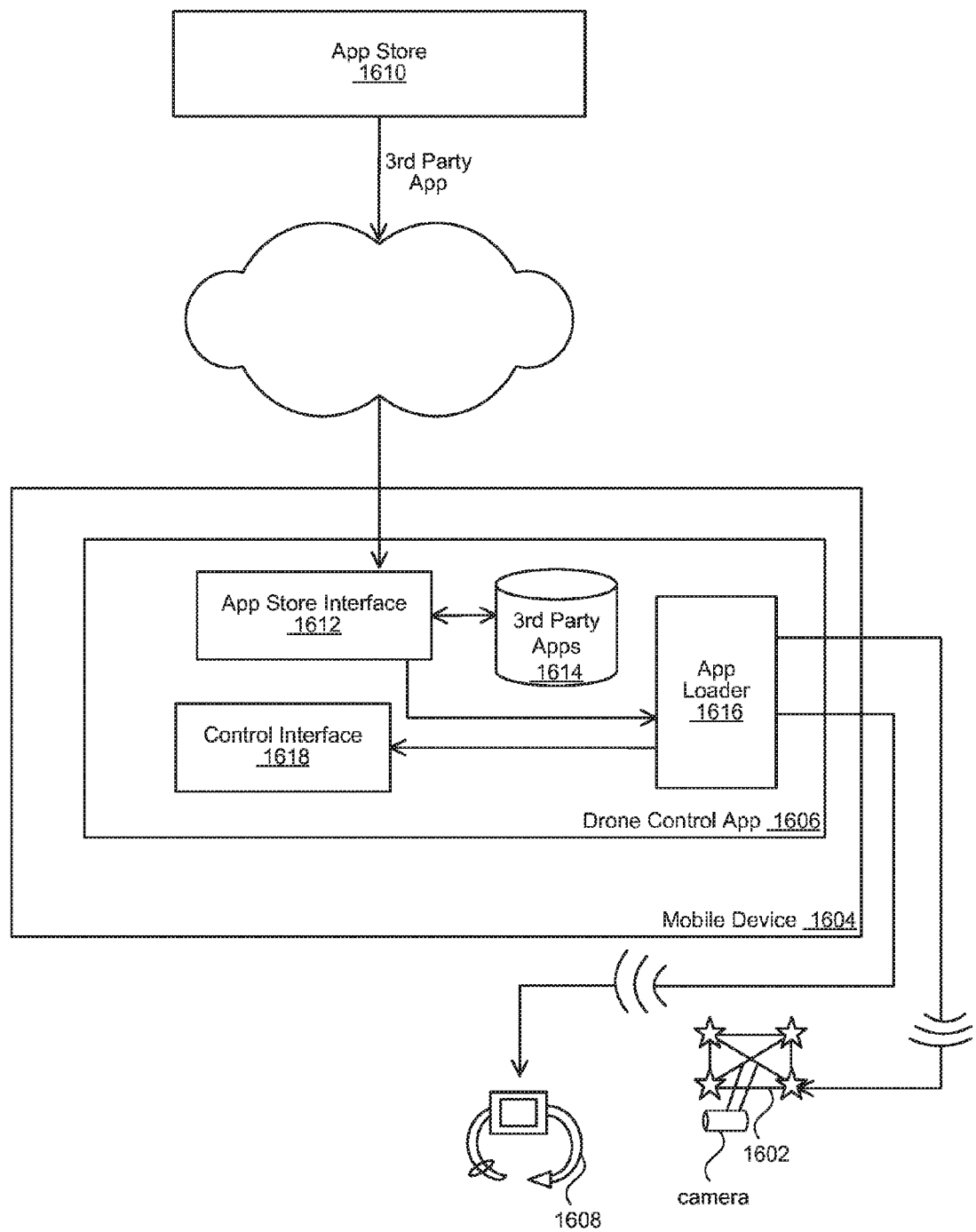
FIG. 16 is a block diagram of a system environment for a consumer user to install a third-party application for controlling a consumer drone, in accordance with various embodiments.

FIG. 16 is a block diagram of a system environment for a consumer user to install a third-party application for controlling a consumer drone, in accordance with various embodiments. In various embodiments, a user of a consumer drone can download applications for an autonomous drone 1602 (e.g., the autonomous drone 1308 of FIG. 13 or the consumer drone 1400 of FIG. 14) through a mobile device 1604 (e.g., the mobile device 1310 of FIG. 13 or the operator device 1500 of FIG. 15) running a drone control application 1606 (e.g., the drone vendor application 1332 of FIG. 13). In various embodiments, the user can also download applications to supplement the functionalities of the drone control application 1606. In various embodiments, the user can download applications for an external operator device 1608 (e.g., the wearable device 1312 of FIG. 13 or the operator device 1500 of FIG. 15).

The user can download any of the above applications from an application store 1610 through an application store interface 1612 of the drone control application 1606. The application store 1610 can be implemented by one or more computing devices. For example, the application store interface 1612 can authenticate itself with the application store 1610. Once authenticated, the application store 1610 can generate and provide a list of available applications to the mobile device 1604. The application store 1610 can categorize the available applications by version, functionality or utility, device type (e.g., drone, mobile device, or wearable device) to install on, version date, or any combination thereof.

The application store interface 1612 can store any downloaded application in a third-party application database 1614. Through the application store interface 1612, the user can cause the downloaded application to be installed through an application loader 1616. The application loader 1616 can load and/or install the downloaded application into the autonomous drone 1602, the operator device 1608, or a control interface 1618 of the drone control application 1606. The control interface 1618 provides a user interface and/or logical instructions for the user to control and operate the autonomous drone 1602.

For example, once the downloaded application is loaded and/or installed onto the autonomous drone 1602, the user can remotely access or execute (e.g., via the control interface 1618) the functionalities of the application that is running on the autonomous drone 1602. For another example, once the downloaded application is loaded and/or installed onto the operator device 1608, the user can remotely access or execute (e.g., via the control interface 1618) the functionalities of the application that is running on the operator device 1608. For yet another example, the application loader 1616 can install the downloaded application as an upgrade or additional plug-in to the control interface 1618. Alternatively, the application loader 1616 can install the downloaded application on the mobile device 1604 and configure the application to run concurrently and cooperatively with the control interface 1618.

The modules in above figures can be implemented as hardware components, software components, or any combination thereof. For example, the modules described can be software components implemented as instructions on a non-transitory memory capable of being executed by a processor or a controller on a computer system described in FIG. 17. For another example, the methods and other techniques introduced in the modules can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module. Each of the data storages can operate individually and independently of other data storages. Some or all of the data storages can be combined as one data storage. A single data storage can also be divided into sub-storages, each containing a portion of the single data storage.

The storages or "stores", described below are hardware components or portions of hardware components for storing digital data. Each of the storage can be a single physical entity or distributed through multiple physical devices. Each of the storage can be on separate physical devices or share the same physical device or devices. Each of the stores can allocate specific storage spaces for run-time applications, processes, or modules. The systems and devices above can include additional, fewer, or different modules for various applications.

Figure 17:
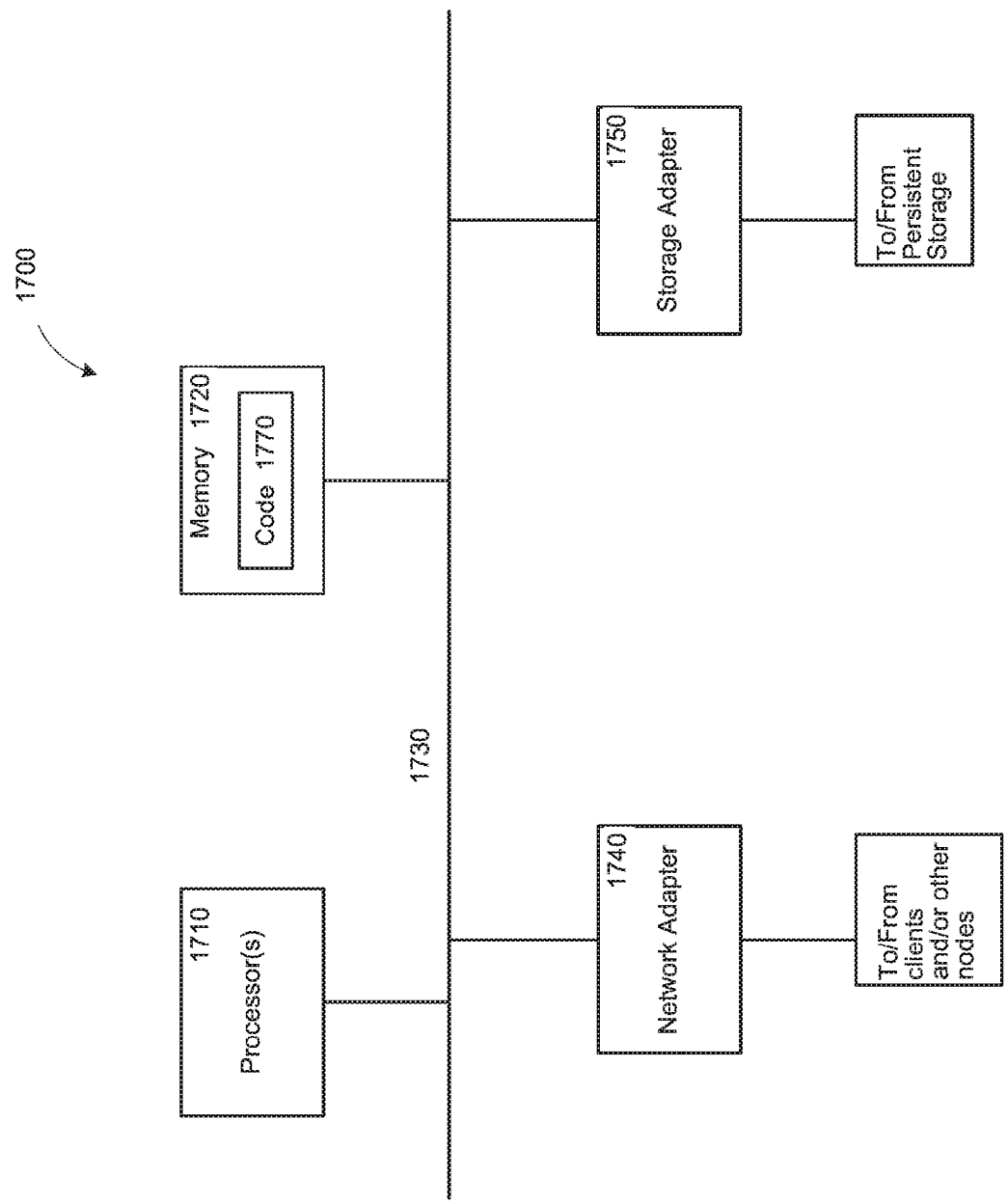
FIG. 17 is a block diagram of an example of a computing device, which may represent one or more computing device or server described herein, in accordance with various embodiments.

FIG. 17 is a block diagram of an example of a computing device 1700, which may represent one or more computing device or server described herein, in accordance with various embodiments. The computing device 1700 can represent one of the computers implementing the developer network system 1302 of FIG. 13 or the application store 1610 of FIG. 16. The computing device 1700 includes one or more processors 1710 and memory 1720 coupled to an interconnect 1730. The interconnect 1730 shown in FIG. 17 is an abstraction that represents any one or more separate physical buses, point-to-point connections, or both connected by appropriate bridges, adapters, or controllers. The interconnect 1730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1710 is/are the central processing unit (CPU) of the computing device 1700 and thus controls the overall operation of the computing device 1700. In certain embodiments, the processor(s) 1710 accomplishes this by executing software or firmware stored in memory 1720. The processor(s) 1710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1720 is or includes the main memory of the computing device 1700. The memory 1720 represents any form of random access memory (RAM), read-only memory (ROM), flash memory, or the like, or a combination of such devices. In use, the memory 1720 may contain a code 1770 containing instructions according to the mesh connection system disclosed herein.

Also connected to the processor(s) 1710 through the interconnect 1730 are a network adapter 1740 and a storage adapter 1750. The network adapter 1740 provides the computing device 1700 with the ability to communicate with remote devices, over a network and may be, for example, an Ethernet adapter or Fibre Channel adapter. The network adapter 1740 may also provide the computing device 1700 with the ability to communicate with other computers. The storage adapter 1750 allows the computing device 1700 to access a persistent storage, and may be, for example, a Fibre Channel adapter or SCSI adapter.

The code 1770 stored in memory 1720 may be implemented as software and/or firmware to program the processor(s) 1710 to carry out actions described above. In certain embodiments, such software or firmware may be initially provided to the computing device 1700 by downloading it from a remote system through the computing device 1700 (e.g., via network adapter 1740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/ non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

Some embodiments include an unmanned aerial vehicle (UAV) copter comprising: one or more propeller drivers; a control system that controls the propeller drivers by managing power supplied to the propeller drivers, wherein the control system is configured to calibrate the propeller drivers when the UAV copter is initiated; a battery compartment adapted to receive a primary battery pack that provides power to the control system and the propeller drivers; and a backup battery module adapted to recharge power from the primary battery pack when the primary battery pack is coupled to the battery compartment and to supply power to the control system to maintain calibration data of the control system when the primary battery pack is absent from the battery compartment. Some embodiments include an unmanned aerial vehicle (UAV) copter comprising: a mechanical frame including a battery compartment; one or more propeller drivers mounted on the mechanical frame; and an external shell exposing the propeller drivers and enclosing the mechanical frame, wherein the external shell includes a bottom cover that is adapted to slide open to expose the battery compartment while maintaining attachment to the mechanical frame.

For example, the bottom cover can be attached via rods that are hinged to the mechanical frame at hinge locations. The rods can be adapted to rotate at hinge locations to push the bottom cover out and sideway from the battery compartment.

Some embodiments include an unmanned aerial vehicle (UAV) copter comprising: a mechanical frame; one or more propeller drivers mounted on the mechanical frame, wherein the propeller drivers are pre-processed to be waterproof; and an external shell exposing the propeller drivers and hermetically sealing the mechanical frame and electronic components of the UAV copter other than the propeller drivers.

Some embodiments include a method of operating an unmanned aerial vehicle (UAV) copter for consumer photography or videography. The method can include: determining a first elevation of the UAV copter and a second elevation of an operator device; adjusting the first elevation by controlling thrust power of one or more propeller drivers to maintain a preset elevation difference between the first elevation and the second elevation; locating a target subject relative to the UAV copter; and adjusting at least one of the propeller drivers to point a first camera of the UAV copter at the operator device. In one example, locating the target subject relative to the UAV copter can include determining a coordinate location of the UAV copter based on a global positioning system (GPS) module in the UAV copter. In another example, locating the target subject relative to the UAV copter can include determining a coordinate location of the UAV copter based on an inertial sensor reading from one or more inertial sensors in the UAV copter. The inertial sensors can include a 3-axis accelerometer, a 3-axis magnetometer, a 3-axis gyroscope, or any combination thereof. In yet another example, locating the target subject relative to the UAV copter can include receiving a coordinate location of an operator device expected to be in possession of the target subject. In a specific example, locating the target subject relative to the UAV copter can include receiving an inertial sensor reading from an operator device expected to be in possession of the target subject; and calculating a coordinate location of the operator device based on the inertial sensor reading.

In one example, determining the first elevation of the UAV copter includes calculating the first elevation based on a barometer reading, a GPS z-axis reading, an inertial sensor reading, or a combination thereof. In one example, determining the second elevation of the operator device includes: receiving a sensor reading from the operator device, the sensor reading including a barometer reading, a GPS z-axis reading, an inertial sensor reading, or a combination thereof; and calculating the second elevation based on the sensor reading.

In some embodiments, determining the second elevation of the operator device includes receiving the second elevation from the operator device.

In some embodiments, locating the target subject relative to the UAV copter includes tracking the target subject in a camera frame of a second camera in the UAV copter. The first camera can be the same as the second camera or a different and separate device.

In some embodiments, tracking the target subject includes performing person detection using histogram of oriented gradients. In some embodiments, adjusting the at least one of the propeller drivers includes determining that the UAV copter is operating in an autonomous mode or a semi-autonomous mode; and wherein, in either the autonomous mode or the semi-autonomous mode, no operator controls yaw of the UAV copter.

Several embodiments can include a mobile device for controlling an unmanned aerial vehicle (UAV) copter. The mobile device can be a mobile phone. The mobile device can include a user interface configured with interface elements to control pitch and roll of the UAV copter without any control element for yaw and elevation; a global positioning system (GPS) module configured to report coordinates of the mobile device and an elevation of the mobile device; and one or more inertial sensors configured to measure inertial sensor readings that is used to derive a three dimensional location of the mobile device. In some embodiments, the mobile device further comprises a band to secure the mobile device to a person. In some embodiments, the mobile device further comprises a hermetic seal to waterproof the mobile device.

Several embodiments include an unmanned aerial vehicle (UAV) copter. The UAV copter can include a sideway facing camera; a downward facing camera; an image processor component configured to locate a target subject in a camera frame of either the sideway facing camera or the downward facing camera; and a propeller control component configured to maintain a constant elevation relative to an operator device and to adjust yaw of the UAV copter such that the target subject remains substantially near a center of the camera frame. The image processor component can be configured to determine a motion vector of the target subject. The propeller control component can be configured to adjust the yaw in anticipation to a movement of the target subject based on the determined motion vector.

Several embodiments include a method of operating an unmanned aerial vehicle (UAV) copter. The method can comprise: detecting that the UAV copter has been thrown; in response to detecting that the UAV copter has been thrown, computing power adjustments for propeller drivers of the UAV copter to have the UAV copter reach a predetermined elevation above an operator device; supplying power to the propeller drivers in accordance with the computed power adjustments; determining a power source of the UAV copter is soon to be out of charge; navigating the UAV copter to land on a ground surface in response to the determining, or any combination thereof.

Several embodiments include a non-transitory computer readable storage medium. The computer readable storage medium can be a data storage memory apparatus storing executable instructions, that when executed by a processor, is operable to implement a process.

In some embodiments, the process comprises: providing a link from a mobile device to an application store to download a third-party application package for a consumer drone or a control device capable of wirelessly coupling to the consumer drone to control the consumer drone; storing the third-party application package on the mobile device; loading the third-party application package to the consumer drone; and remotely executing the third-party application on the consumer drone. In some embodiments, the third-party application package includes a code library of a development kit that provides access to data from a sensor in the consumer drone, exposes control of a hardware component of the consumer drone, or exposes high-level instruction sequence or functionality provided by an operating system or application-specific vendor application installed on the consumer drone.

In some embodiments, the process comprises: implementing a user control interface to control operations of a consumer drone from a mobile device; providing a link from the mobile device to an application store to download a third-party application package for a consumer drone or a control device capable of wirelessly coupling to the consumer drone to control the consumer drone; storing the third-party application package on the mobile device; and adjusting the control interface based on the third-party application package. The third-party application package can include a code library of a development kit that exposes high-level instruction sequence or functionality provided by application-specific vendor application installed on the mobile device.

Some embodiments, the process comprises: providing a link from a mobile device to an application store to download a third-party application package for a consumer drone or a control device capable of wirelessly coupling to the consumer drone to control the consumer drone; storing the third-party application package on the mobile device; loading the third-party application package to a wearable device that controls or facilitates control of the consumer drone; and remotely executing the third-party application on the wearable device. The third-party application package can include a code library of a development kit that provides access to data from a sensor in the wearable device, exposes control of a hardware component of the wearable device, or exposes high-level instruction sequence or functionality provided by an operating system or application-specific vendor application installed on the wearable device.

Several embodiments include a propeller driver for an unmanned aerial vehicle (UAV) copter. Propeller driver can include a motor configured to rotate a motor shaft when power is supplied to the motor; a first plate mechanically coupled to the motor shaft such that rotating the motor shaft causes the first plate to rotate; a second plate mechanically coupled to the motor shaft such that rotating the motor shaft causes the second plate to rotate; at least two rods attached between the first plate and the second plate; and at least two propeller blades rotatably coupled respectively to the two rods. In some embodiments, at least one of the propeller blades is capable of being manually rotated, around at least one of the rod, toward another one of the propeller blades. In some embodiments, the two propeller blades are adapted to extend away from the motor shaft when the motor shaft is been rotated. In some embodiments, the propeller driver further comprises a set screw that threads through the first plate to mechanically couple the first plate to the motor shaft. The motor shaft can be at least partially threaded to wind into a threaded hole in the second plate.

Several embodiments include a UAV copter comprising: a plurality of propellers; a plurality of propeller drivers adapted to drive the propellers; an inertial sensor component; a wireless communication component configured to communicate with a remote operator device to determine relative positions between the UAV copter and the remote operator device; and a control system. The control system can be configured to: monitor inertial sensor readings from the inertial sensor component when the plurality of propeller drivers are turned off; detect that the UAV copter has been thrown upward while the plurality of propeller drivers are turned off by comparing a preset acceleration pattern against the inertial sensor readings; in response to detecting that the UAV copter has been thrown upward, computing power levels for the propeller drivers to launch the UAV copter in mid-air and to reach a predetermined elevation above the remote operator device; and supply power to the propeller drivers in accordance with the computed power levels. The acceleration pattern can be a predetermined level of acceleration magnitude, a predetermined level of upward acceleration and away from downward pull of gravity, a change in direction of an acceleration vector of the UAV copter according to the inertial sensor readings, or any combination thereof.

Computing the power levels can include determining how much power to supply to each of the propellers to rotate the UAV copter to a balanced state that is capable of maintaining a constant elevation above ground. Computing the power levels can also include determining how much power to supply to each of the propellers to maintain flight above a predetermined absolute elevation reading and/or determining how much power to supply to each of the propellers to maintain flight above a predetermined elevation above the remote operator device.

In some embodiments, the UAV copter can further comprise a power source. The control system can determine the power source is soon to be out of charge by comparing a charge ratio of the power source to a preset percentage of charge and navigate the UAV copter to land on a ground surface in response to said determining that the power source is soon to be out of charge.

Several embodiments includes method of operating a UAV copter. The method can comprise: detecting that the UAV copter has been thrown upward and before reaching free fall while a plurality of propeller drivers of the UAV copter are inert; in response to detecting that the UAV copter has been thrown upward and before reaching free fall, computing power adjustments for the plurality of propeller drivers to have the UAV copter reach a predetermined elevation above an operator device; and supplying power to the propeller drivers in accordance with the computed power adjustments. In one example, to detect the UAV copter has been thrown, the UAV copter can monitor velocity readings of the UAV copter and determine that the UAV copter has been thrown upward by comparing the velocity readings to a preset upward velocity. In one example, to detect the UAV copter has been thrown, the UAV copter can monitor elevation readings of the UAV copter and determine that the UAV copter has been thrown upward by detecting a change in elevation of the UAV copter based on the elevation readings. For example, monitoring the elevation readings includes monitoring a z-axis coordinate value of the UAV copter from a global positioning system (GPS) module on the UAV copter. For example, monitoring the elevation readings includes monitoring a barometer reading from a barometer on the UAV copter.

In one example, to detect the UAV copter has been thrown, the UAV copter can detect motion via one or more cameras on the UAV copter. Detecting the motion can include detecting the motion from one or more video feeds of the cameras by comparing consecutive frames. In some embodiments, an autofocusing mechanism of the cameras is used to detect the motion.

Several embodiments include a computer readable data memory storing computer-executable instructions that, when executed by a computer system, cause the computer system to perform a computer-implemented method. The computer-executable instructions can comprise: instructions for monitoring sensor readings from a sensor of an unmanned aerial vehicle (UAV) copter when a plurality of propeller drivers of the UAV copter are turned off; instructions for detecting that the UAV copter has been thrown upward by comparing a preset pattern against the sensor readings; instructions for, in response to detecting that the UAV copter has been thrown upward, computing power levels for the propeller drivers to launch the UAV copter in mid-air and to reach a predetermined elevation above a remote operator device separate from the UAV copter; instructions for supplying power to the propeller drivers in accordance with the computed power levels; instructions for calibrating the propeller drivers on an even ground surface prior to being launched in midair; instructions for calibrating the propeller drivers in midair; instructions for skipping calibration of the propeller drivers in response to the UAV copter having had uninterrupted power since a previous calibration session, or any combination thereof.

Some embodiments of the disclosure have other aspects, elements, features, and steps in addition to or in place of what is described above. These potential additions and replacements are described throughout the rest of the specification. Reference in this specification to "various embodiments," several embodiments, or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

For convenience, headings, titles, or subtitles may be used in the examples for convenience of a reader, which in no way should limit the scope of the disclosure. Also for convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

What is claimed is:

1. An unmanned aerial vehicle (UAV) copter comprising:
a plurality of propellers;
a plurality of propeller drivers adapted to drive the propellers;
an inertial sensor component;
a wireless communication component configured to communicate with a remote operator device to determine relative positions between the UAV copter and the remote operator device; and
a control system configured to:
monitor inertial sensor readings from the inertial sensor component when the plurality of propeller drivers are turned off;
detect that the UAV copter has been thrown upward while the plurality of propeller drivers are turned off by comparing a preset acceleration pattern against the inertial sensor readings;
in response to detecting that the UAV copter has been thrown upward, computing power levels for the propeller drivers to launch the UAV copter in mid-air and to reach a predetermined elevation above the remote operator device; and
supply power to the propeller drivers in accordance with the computed power levels.

2. The UAV copter of claim 1, wherein the acceleration pattern is a predetermined level of acceleration magnitude.

3. The UAV copter of claim 1, wherein the acceleration pattern is a predetermined level of upward acceleration away from downward pull of gravity.

4. The UAV copter of claim 1, wherein the acceleration pattern is a change in direction of an acceleration vector of the UAV copter according to the inertial sensor readings.

5. The UAV copter of claim 1, wherein said computing the power levels includes determining how much power to supply to each of the propellers to rotate the UAV copter to a balanced state that is capable of maintaining a constant elevation above ground.

6. The UAV copter of claim 1, wherein said computing the power levels includes determining how much power to supply to each of the propellers to maintain flight above a predetermined absolute elevation reading.

7. The UAV copter of claim 1, wherein said computing the power levels includes determining how much power to supply to each of the propellers to maintain flight above a predetermined elevation above the remote operator device.

8. The UAV copter of claim 1, further comprising a power source; and wherein the control system is configured to determine the power source is soon to be out of charge by comparing a charge ratio of the power source to a preset percentage of charge and to navigate the UAV copter to land on a ground surface in response to said determining that the power source is soon to be out of charge.

9. A method of operating an unmanned aerial vehicle (UAV) copter, comprising:
- detecting that the UAV copter has been thrown upward and before reaching free fall while a plurality of propeller drivers of the UAV copter are inert;
- in response to detecting that the UAV copter has been thrown upward and before reaching free fall, computing power adjustments for the plurality of propeller drivers to have the UAV copter reach a predetermined elevation above an operator device; and
- supplying power to the propeller drivers in accordance with the computed power adjustments.

10. The method of claim 9, wherein said detecting the UAV copter has been thrown upward includes:
- monitoring velocity readings of the UAV copter; and
- determining that the UAV copter has been thrown upward by comparing the velocity readings to a preset upward velocity.

11. The method of claim 9, wherein said detecting the UAV copter has been thrown upward includes:
- monitoring elevation readings of the UAV copter; and
- determining that the UAV copter has been thrown upward by detecting a change in elevation of the UAV copter based on the elevation readings.

12. The method of claim 11, wherein monitoring the elevation readings includes monitoring a z-axis coordinate value of the UAV copter from a global positioning system (GPS) module on the UAV copter.

13. The method of claim 11, wherein monitoring the elevation readings includes monitoring a barometer reading from a barometer on the UAV copter.

14. The method of claim 9, wherein said detecting the UAV copter has been thrown upward includes detecting motion via one or more cameras on the UAV copter.

15. The method of claim 14, wherein said detecting the motion includes detecting the motion from one or more video feeds of the cameras by comparing consecutive frames.

16. The method of claim 14, wherein an autofocusing mechanism of the cameras is used to detect the motion.

17. A non-transitory computer readable data memory storing computer-executable instructions that, when executed by a computer system, cause the computer system to perform a computer-implemented method, the computer-executable instructions comprising:
- instructions for monitoring sensor readings from a sensor of an unmanned aerial vehicle (UAV) copter when a plurality of propeller drivers of the UAV copter are turned off;
- instructions for detecting that the UAV copter has been thrown upward by comparing a preset pattern against the sensor readings;
- instructions for, in response to detecting that the UAV copter has been thrown upward, computing power levels for the propeller drivers to launch the UAV copter in mid-air and to reach a predetermined elevation above a remote operator device separate from the UAV copter; and
- instructions for supplying power to the propeller drivers in accordance with the computed power levels.

18. The non-transitory computer readable data memory of claim 17, wherein the computer-executable instructions further comprises instructions for calibrating the propeller drivers on an even ground surface prior to being launched in midair.

19. The non-transitory computer readable data memory of claim 17, wherein the computer-executable instructions further comprises instructions for calibrating the propeller drivers in midair.

20. The non-transitory computer readable data memory of claim 17, wherein the computer-executable instructions further comprises instructions for skipping calibration of the propeller drivers in response to the UAV copter having had uninterrupted power since a previous calibration session.

\* \* \* \* \*